US012189798B2

(12) United States Patent
Kimura

(10) Patent No.: US 12,189,798 B2
(45) Date of Patent: Jan. 7, 2025

(54) INFORMATION PROCESSING APPARATUS PERFORMING CONTROL TO PREVENT SETTING VALUES ASSOCIATED WITH ANY USAGE ENVIRONMENT IN THE PLURALITY OF USAGE ENVIRONMENTS FROM BEING SET TO THE INFORMATION PROCESSING APPARATUS

(71) Applicant: CANON KABUSHIKI KAISHA, Tokyo (JP)

(72) Inventor: Tomohiro Kimura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/363,445

(22) Filed: Aug. 1, 2023

(65) Prior Publication Data
US 2024/0045977 A1 Feb. 8, 2024

(30) Foreign Application Priority Data
Aug. 4, 2022 (JP) ................ 2022-124676

(51) Int. Cl.
*G06F 21/60* (2013.01)
*H04N 1/00* (2006.01)

(52) U.S. Cl.
CPC .......... *G06F 21/608* (2013.01); *G06F 21/604* (2013.01); *H04N 1/00427* (2013.01)

(58) Field of Classification Search
CPC . G06F 21/608; G06F 21/604; H04N 1/00427; H04N 1/00411; H04N 1/00416; H04N 1/00474
See application file for complete search history.

(56) References Cited

U.S. PATENT DOCUMENTS

2004/0114601 A1* 6/2004 Watanabe ............. H04L 67/303
 370/395.2
2014/0376027 A1* 12/2014 Adachi ............. G06K 15/4095
 358/1.14

(Continued)

FOREIGN PATENT DOCUMENTS

JP 2007185814 A 7/2007
JP 2012119809 A 6/2012

*Primary Examiner* — Iriana Cruz
(74) *Attorney, Agent, or Firm* — Canon U.S.A., Inc. IP Division

(57) ABSTRACT

An information processing apparatus having a first function and a second function which is a function different from the first function, in the first function, sets, to the information processing apparatus, a first setting value group associated with a security policy set to the information processing apparatus, in the second function, sets, to the information processing apparatus, a second setting value group associated with one usage environment selected from among a plurality of usage environments, and in a case where the security policy is currently set to the information processing apparatus in the first function, in the second function, performs control to prevent a setting value group associated with any usage environment in the plurality of usage environments from being set to the information processing apparatus, wherein the first setting value group and the second setting value group include setting values corresponding to an identical setting item.

16 Claims, 11 Drawing Sheets

(56) References Cited

U.S. PATENT DOCUMENTS

| | | | |
|---|---|---|---|
| 2016/0014161 A1* | 1/2016 | Sato | H04L 63/083 |
| | | | 726/1 |
| 2016/0044040 A1* | 2/2016 | Caffary, Jr. | H04L 9/30 |
| | | | 726/4 |
| 2022/0198040 A1* | 6/2022 | Yoneda | G06F 21/629 |

* cited by examiner

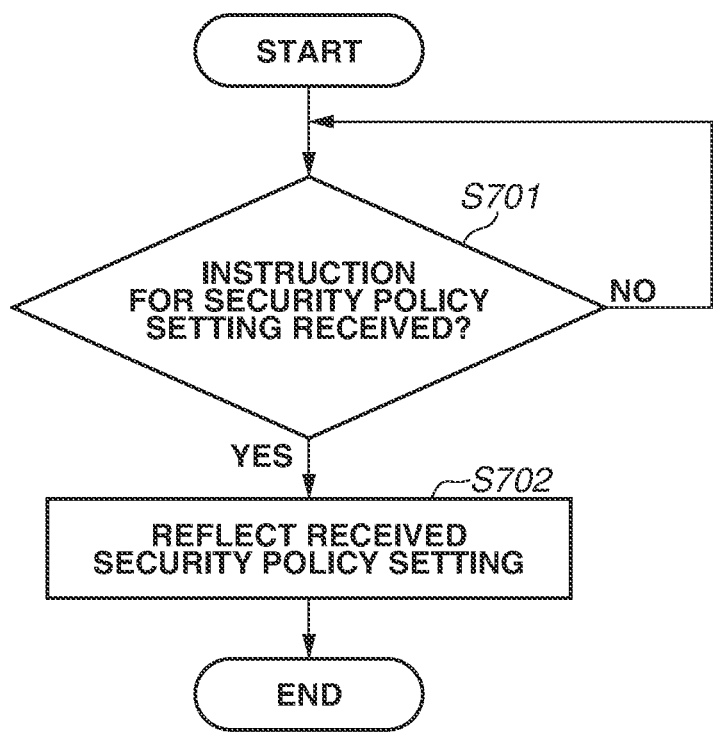

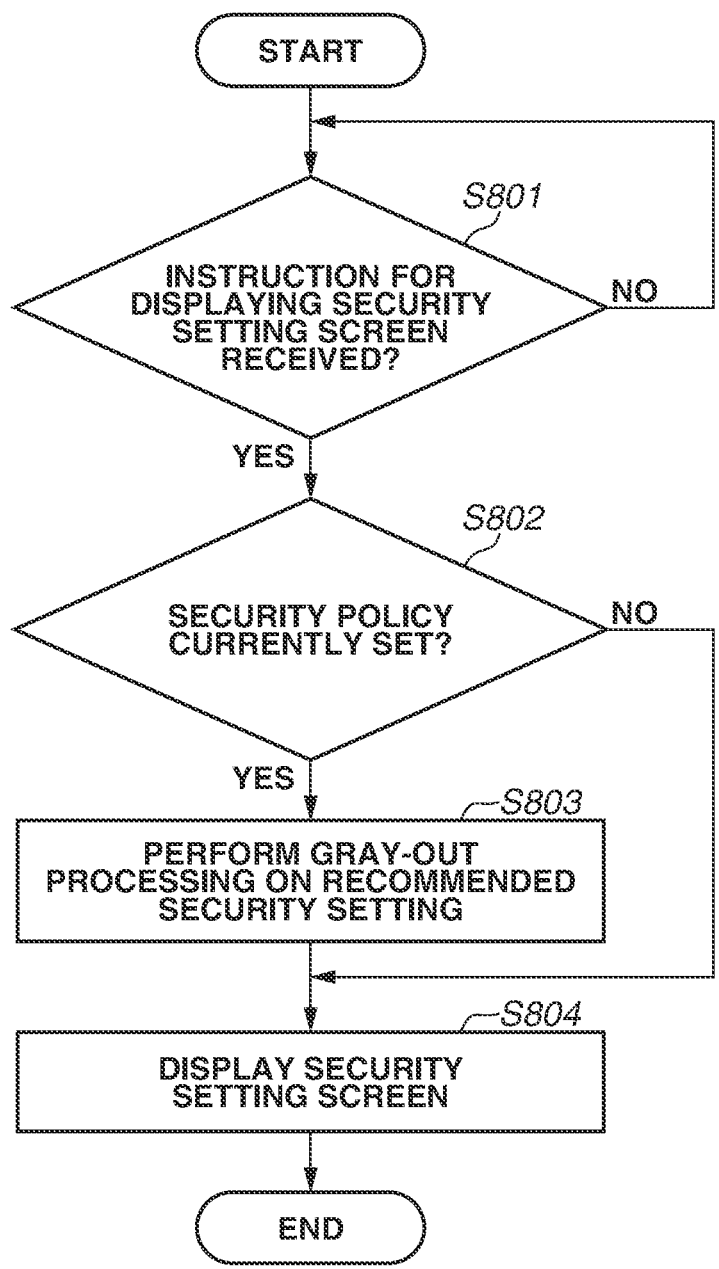

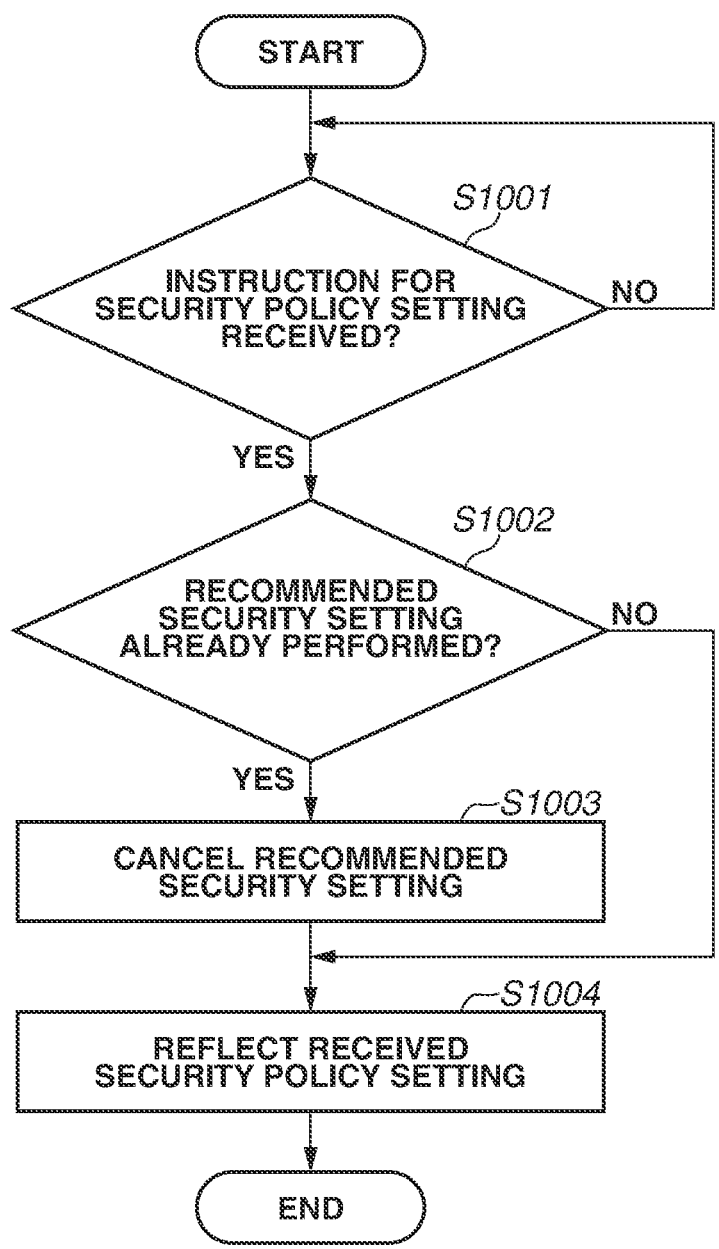

INFORMATION PROCESSING APPARATUS PERFORMING CONTROL TO PREVENT SETTING VALUES ASSOCIATED WITH ANY USAGE ENVIRONMENT IN THE PLURALITY OF USAGE ENVIRONMENTS FROM BEING SET TO THE INFORMATION PROCESSING APPARATUS

BACKGROUND OF THE DISCLOSURE

Field of the Disclosure

Aspects of the present disclosure generally relate to an information processing apparatus which collectively performs setting of security-related functions.

Description of the Related Art

There is known a security policy function which sets a security policy to an information processing apparatus according to a definite course of action adopted by an organization. In the security policy function, a setting value corresponding to the set security policy is set to the information processing apparatus. Since the setting value set by the security policy function is a setting value in which the definite course of action adopted by the organization has been reflected, an external user is not allowed to change the set setting value. Japanese Patent Application Laid-Open No. 2012-119809 discusses a technique in which a user inputs setting of a security policy to an information processing apparatus and is thus enabled to perform setting corresponding to the security policy.

Moreover, recently, information processing apparatuses are installed in a variety of environments, such as a network which is used by teleworking or many and unspecified persons or a public space which is used to share information processing apparatuses on the network, so that a needed security setting is becoming complex and cumbersome. Therefore, Japanese Patent Application Laid-Open No. 2007-185814 discusses a technique in which, in response to a security level being designated by the user, setting of security-related functions of an image forming apparatus corresponding to the set security level is collectively performed. With such a technique, it is possible to collectively set, to the information processing apparatus, setting values which are recommended in an environment for use of the information processing apparatus or a security level required in the environment.

However, in any of Japanese Patent Application Laid-Open No. 2012-119809 and Japanese Patent Application Laid-Open No. 2007-185814, an information processing apparatus having two different functions, i.e., a security policy function which sets setting values corresponding to a security policy set in the information processing apparatus and a function which performs collective setting of recommended setting values, is not assumed. In the case of an information processing apparatus having such two functions, it is conceivable that setting items which are set by the respective functions overlap each other, so that it is necessary to take into account such a conflict as to which of the setting values for the respective two functions to set with respect to the overlapping setting items.

SUMMARY OF THE DISCLOSURE

Aspects of the present disclosure are generally directed to providing security-related functions in which a conflict of the above-mentioned two functions has been taken into account.

According to an aspect of the present disclosure, an information processing apparatus having a first function which sets a setting value group to the information processing apparatus and a second function which is a function different from the first function and which sets a setting value group to the information processing apparatus includes at least one memory that stores instructions, and at least one processor that executes the instructions to perform operations including, in the first function, setting, to the information processing apparatus, a first setting value group associated with a security policy set to the information processing apparatus, in the second function, setting, to the information processing apparatus, a second setting value group associated with one usage environment selected from among a plurality of usage environments, and in a case where the security policy is currently set to the information processing apparatus in the first function, in the second function, performing control to prevent a setting value group associated with any usage environment in the plurality of usage environments from being set to the information processing apparatus, wherein the first setting value group and the second setting value group include setting values corresponding to an identical setting item.

Further features of the present disclosure will become apparent from the following description of exemplary embodiments with reference to the attached drawings.

BRIEF DESCRIPTION OF THE DRAWINGS

FIG. 7 is a flowchart illustrating an example of processing for security policy setting which the image forming apparatus performs.

FIG. 8 is a flowchart illustrating an example of processing for screen display which the image forming apparatus performs in the first exemplary embodiment.

FIG. 10 is a flowchart illustrating an example of processing for security setting which the image forming apparatus performs in a second exemplary embodiment.

DESCRIPTION OF THE EMBODIMENTS

Various exemplary embodiments, features, and aspects of the disclosure will be described in detail below with reference to the drawings. Furthermore, the following exemplary embodiments are not intended to limit the disclosure set forth in claims, and not all of the combinations of characteristics described in each exemplary embodiment are necessarily essential for the solutions in the disclosure.

Figure 1:
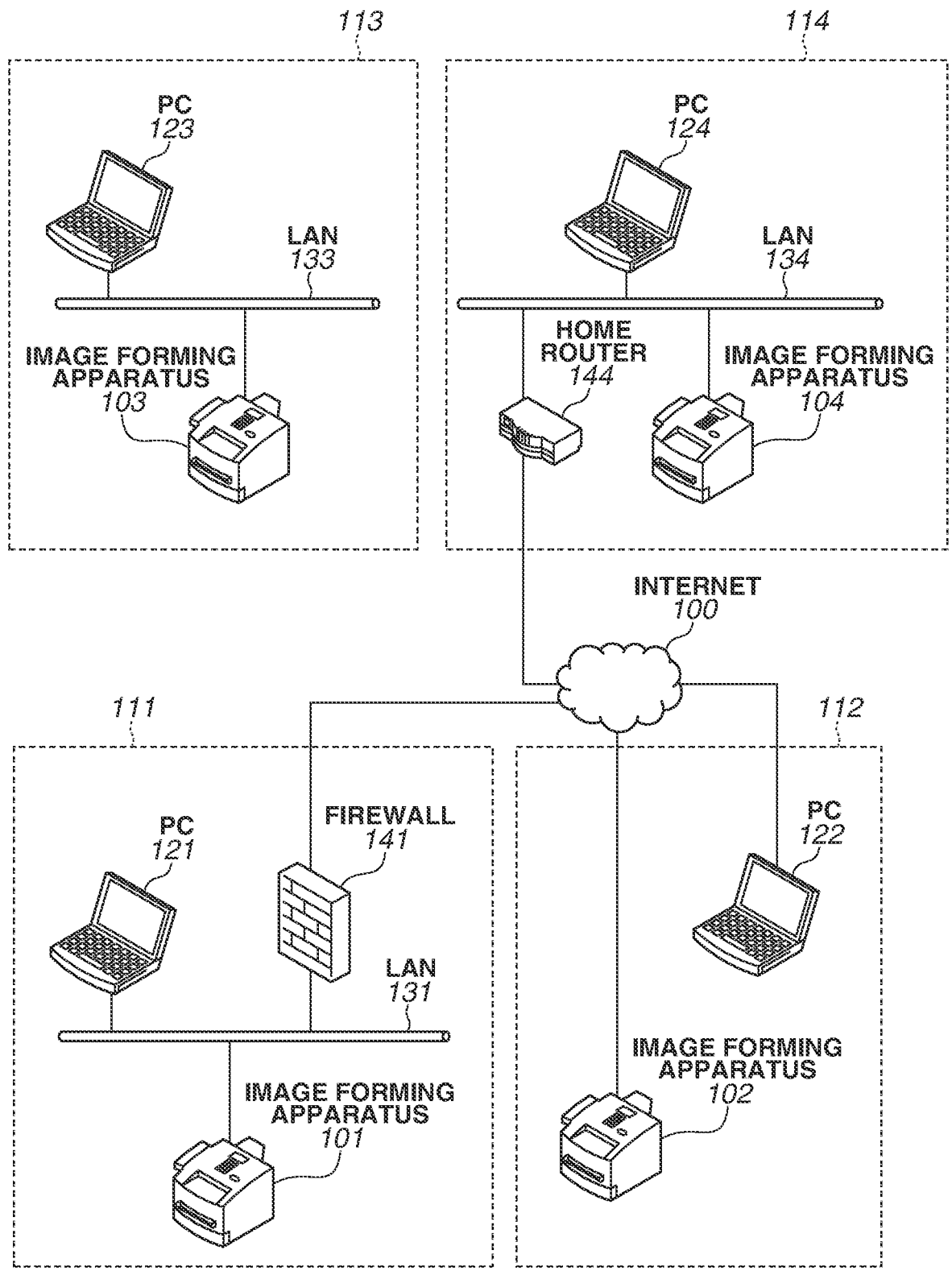
FIG. 1 is a diagram illustrating an example of usage environments for information processing apparatuses.

FIG. 1 is a configuration diagram illustrating an example of usage environments for information processing apparatuses in a first exemplary embodiment.

Image forming apparatuses 101 to 104, each of which is an example of an information processing apparatus in the first exemplary embodiment are installed in respective different usage environments 111 to 114. The usage environments 111 to 114, each of which is illustrated as an example in FIG. 1, correspond to an intra-company environment 211, an Internet direct connection environment 212, an Internet prohibited environment 213, and a teleworking environment 214, respectively.

The usage environment 111, which corresponds to the intra-company environment 211, is an environment in which the image forming apparatus 101 and a personal computer (PC) 121 are interconnected via an intra-company local area network (LAN) 131. A firewall 141 is installed at the boundary between the LAN 131 and the Internet 100. Thus, a communication between various information processing apparatuses included in the intra-company environment 211 and the Internet 100 is monitored and protected by the firewall 141. Therefore, in the intra-company environment 211, threats of, for example, accesses to each information processing apparatus by attackers via the Internet 100 are greatly reduced.

On the other hand, in the usage environment 112, which corresponds to the Internet direct connection environment 212, no firewall is installed. The Internet direct connection environment 212 is an environment in which the image forming apparatus 102 and the PC 122 are directly connected to the Internet 100 to perform communication. Therefore, an information processing apparatus, such as the image forming apparatus 102 or the PC 122, needs to have measures against, for example, accesses by attackers via the Internet 100, with use of, for example, a personal firewall function included in each information processing apparatus.

The usage environment 113, which corresponds to the Internet prohibited environment 213, is a closed network environment separated from a different network such as the Internet 100. In the usage environment 113, information processing apparatuses, such as the image forming apparatus 103 and the PC 123 are interconnected via a LAN 133. In the Internet prohibited environment 213, network communication is available only between the respective information processing apparatuses installed on the LAN 133. The respective information processing apparatuses are never accessed by an unspecified user on the Internet 100.

The usage environment 114, which corresponds to the teleworking environment 214, is an environment in which the image forming apparatus 104 and the PC 124 are interconnected via a home LAN 134. The LAN 134, which is a private network configured with a home router 144, does not have security measures using a robust firewall such as in the intra-company environment 211. Therefore, each information processing apparatus installed in the teleworking environment 214 needs to have measures against, for example, accesses by attackers via the Internet 100, with use of, for example, a personal firewall function included in each information processing apparatus, as with the Internet direct connection environment 212.

In the first exemplary embodiment, in addition to the usage environments 111 to 114, a public space environment and a highly confidential information management environment (both not illustrated) are assumed. In the following description, classification of the above-mentioned six usage environments is described in detail with reference to FIG. 2.

Figure 2:
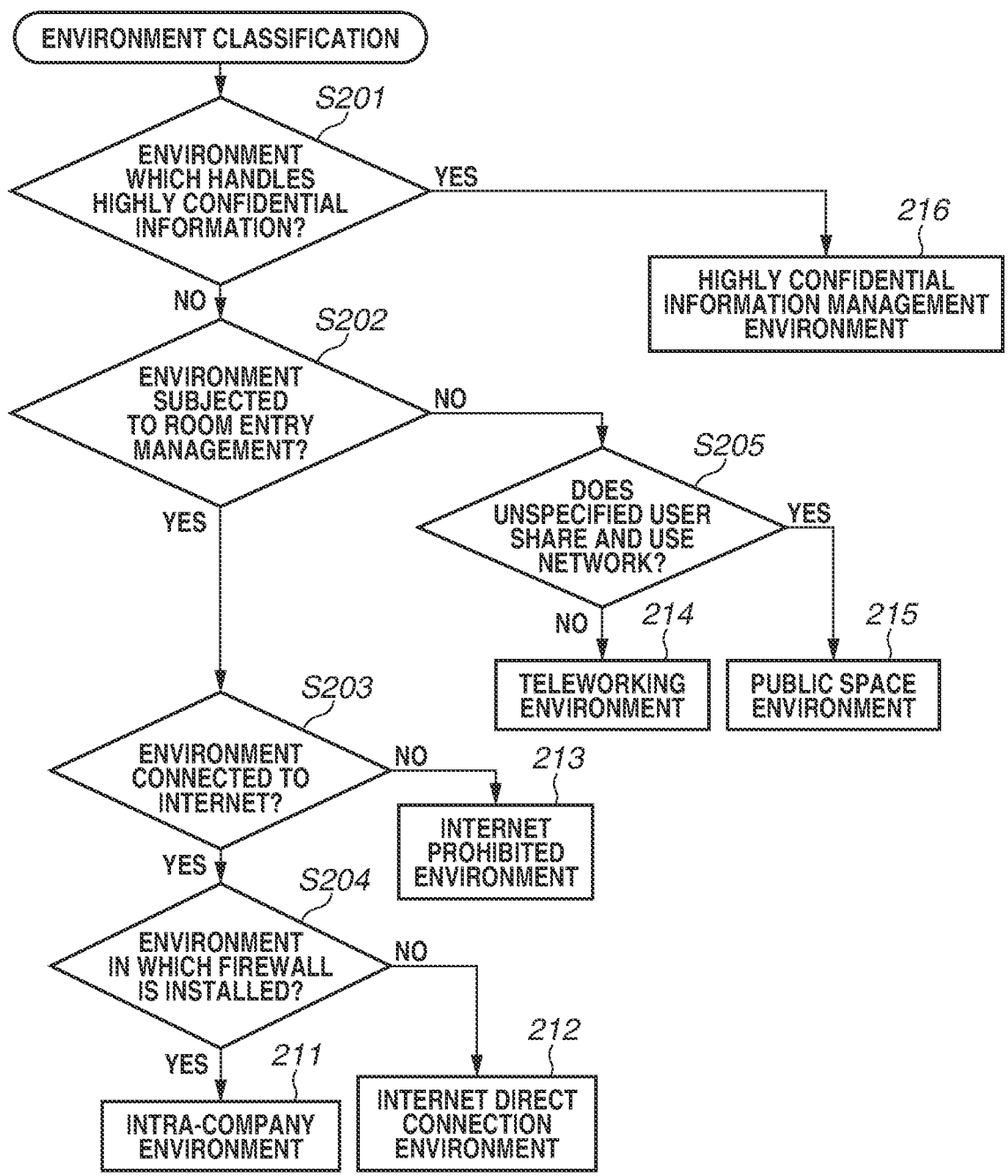
FIG. 2 is a flowchart illustrating an example of conditions for classifying usage environments for information processing apparatuses.

In the first exemplary embodiment, the usage environments for information processing apparatuses are classified into six usage environments and a security setting adapted for each of the classified usage environments is provided. FIG. 2 is a flowchart illustrating a concept of classification in classifying and defining the usage environments. Furthermore, the following definition of usage environments is not intended to limit the disclosure, and some of the usage environments described as an example in the first exemplary embodiment or an additional usage environment can be defined. For example, under the assumption that information processing apparatuses are installed in a company, usage environments can be classified for each category of business, such as financial company or civil service.

Step S201 is a classification for determining whether the usage environment concerned is an environment which handles highly confidential information. It can be said that an environment which handles highly confidential information is an environment for which first priority needs to be given to security measures. Hereinafter, in the first exemplary embodiment, such an environment for which first priority needs to be given to security measures (YES in step S201) is defined as a highly confidential information management environment 216.

If the usage environment concerned is not an environment which handles highly confidential information (NO in step S201), the classification of usage environments is subdivided. Step S202 is a classification for determining the usage environment concerned is an environment subjected to room entry management. This is an example of a classification that is based on whether an unspecified user is allowed to physically access the information processing apparatus, in other words, whether a user who enters a place in which the information processing apparatus is installed is limited. Therefore, a condition for classification that is based on whether an unspecified user is allowed to physically access the information processing apparatus is not limited to that in the first exemplary embodiment, but a condition other than room entry management can be set as a condition for classification. Moreover, room entry management in the first exemplary embodiment is not limited to a building access system using a card. For example, an environment in which, during business hours, only persons belonging to the organization are working, so that persons allowed to enter the room are substantially narrowed, and, after business hours, the room is locked is also included in the environment subjected to room entry management.

In a case where room entry management is not set, in other words, where an unspecified user is allowed to physically access the information processing apparatus (NO in step S202), the usage environment is subdivided on a classification condition shown in step S205. Step S205 is a classification for determining whether an unspecified user shares and uses a network included in the environment. In the first exemplary embodiment, an environment in which an unspecified user shares and uses a network included in the environment is defined as a public space environment 215. Moreover, an environment in which no unspecified user shares a network included in the environment is defined as a teleworking environment 214. Furthermore, in the first exemplary embodiment, an environment in which no unspecified user shares a network included in the environment such as the teleworking environment 214, in other words, an environment in which a user is able to be specified, is defined as a private network environment.

The usage environment classified as being subjected to room entry management (YES in step S202) is subdivided on a classification condition shown in step S203. Step S203 is a classification for determining whether the information processing apparatus included in the environment is connected to an external network such as the Internet. An environment in which the information processing apparatus is not connected to an external network such as the Internet (NO in step S203) is defined as an Internet prohibited environment 213. Furthermore, the Internet prohibited environment 213, in which room entry management is set and which is premised on a closed network, is a private network environment.

In a case where the information processing apparatus included in the environment is connected to an external network such as the Internet (YES in step S203), the usage environment is subdivided on a classification condition shown in step S204. Step S204 is a classification for determining whether a firewall is installed. An environment in which a firewall is installed is defined as an intra-company environment 211. Moreover, an environment in which no firewall is installed (NO in step S204) is defined as an Internet direct connection environment 212. Furthermore, the intra-company environment 211, in which a user who uses a network included in the environment is able to be limited by a firewall, is a private network environment.

Next, the above-mentioned six usage environments and security measures which should be performed in the respective usage environments are described with reference to Table 1. Here, seven examples of security measures are shown.

TABLE 1

|  | Intra-company environment | Internet direct connection environment | Internet prohibited environment |
|---|---|---|---|
| Encryption on communication path | Recommended | Recommended | Optional |
| Disablement of legacy protocol | Recommended | Recommended | Optional |
| Enablement of personal firewall | Optional | Recommended | Optional |
| Safety enhancement of authentication | Recommended | Recommended | Optional |
| Measures against physical attack | Optional | Optional | Optional |
| Disablement of file sharing | Optional | Recommended | Optional |
| Disablement of external storage device | Recommended | Recommended | Recommended |

|  | Teleworking environment | Public space environment | Highly confidential information management environment |
|---|---|---|---|
| Encryption on communication path | Recommended | Recommended | Recommended |
| Disablement of legacy protocol | Recommended | Recommended | Recommended |
| Enablement of personal firewall | Recommended | Recommended | Recommended |
| Safety enhancement of authentication | Recommended | Recommended | Recommended |
| Measures against physical attack | Recommended | Recommended | Recommended |
| Disablement of file sharing | Optional | Recommended | Recommended |
| Disablement of external storage device | Recommended | Recommended | Recommended |

Encryption on communication path is security measures for preventing information leakage by encrypting communication contents on a network. As an example of the function of implementing encryption on a communication path, there is Transport Layer Security (TLS). In an environment which is connected to the Internet, since there is a possibility of eavesdropping of communication contents by a third party, it is desirable to perform encryption on a communication path. In other words, except the Internet prohibited environment 213, it is recommended to perform encryption on a communication path.

Disablement of legacy protocol is security measures for preventing spoofing and information leakage by disabling a function using an unsafe legacy communication protocol. As an example of a legacy protocol, there is Windows Internet Name Service (WINS). As with encryption on communication path, it is also desirable to set disablement of legacy protocol in an environment which is connected to an external network such as the Internet. In other words, except the Internet prohibited environment 213, it is recommended to perform disablement of legacy protocol.

The personal firewall is a firewall which is installed on an information processing apparatus to be used. As with an ordinary firewall, the personal firewall monitors communications between an information processing apparatus and an external network such as the Internet. Examples of the firewall include an Internet Protocol (IP) filter and a port number filter. The IP filter is security measures which read destination information or source information of a communication packet and allow only a preliminarily set communication packet. With this IP filter, it is possible to prevent unauthorized access, thus preventing information leakage. The port number filter is security measures which close an unused port in advance, thus preventing intrusion from the port. With this port number filter, it is possible to prevent a denial-of-service attack (DoS attack), which is a cyberattack to put a large amount of load so as to cause vulnerability. In an environment which is connected to an external network and in which no firewall is installed, since there is a possibility of information leakage or a DoS attack, it is desirable to enable the personal firewall. In other words, except the Internet prohibited environment 213, which is not connected to an external network, and the intra-company environment 211, in which a firewall is installed, it is recommended to perform enablement of the personal firewall.

Safety enhancement of authentication is to enhance measures against spoofing by, for example, inhibiting caching of a password or specifying the minimum number of letters of a password. Except the Internet prohibited environment 213, in which interconnection is performed within an isolated network, since there is a possibility of spoofing, it is desirable to perform safety enhancement of authentication.

Measures against physical attack is security measures for physically preventing information from being leaked. In each of the image forming apparatuses 101 to 104, temporary data such as a print job is generated within a hard disk. Each of the image forming apparatuses 101 to 104 includes a complete erasure function which automatically performs complete erasure of the generated temporary data concurrently with the end of the job. Examples of the measures against physical attack in each of the image forming apparatuses 101 to 104 include the above-mentioned complete erasure function. If this function is set, even in a case where the hard disk has been physically demounted, the temporary data is never read. In the teleworking environment 214 and the public space environment 215, in each of which room entry management is not set and physical access to an information processing apparatus is unable to be limited, it is desirable to perform measures against physical attack. Moreover, even in the highly confidential information management environment 216, in which reducing the risk of information leakage is given the highest priority, it is desirable to perform measures against physical attack.

The file sharing function is a function of sharing a file on a network in the environment. In an environment in which unspecified users share a network in the environment, in order to prevent information leakage, it is desirable to disable the file sharing function. In other words, except private network environments in which specified users share a network in the environment, it is recommended to disable the file sharing function. As mentioned above, the private network environments in the first exemplary embodiment are the intra-company environment 211, the Internet prohibited environment 213, and the teleworking environment 214. Therefore, in other than these environments, i.e., in the Internet direct connection environment 212, the public space environment 215, and the highly confidential information management environment 216, it is recommended to perform disablement of the file sharing function. Furthermore, as an example of a setting concerning the file sharing function, there is Server Message Block (SMB).

The disablement of external storage device is to perform setting in such a manner that, for example, a Universal Serial Bus (USB) storage device is not allowed to be used as an external storage device for an information processing apparatus. In each of the image forming apparatuses 101 to 104, the USB storage device is used as a storage location of scanned data. With the disablement of external storage device set, it is possible to prevent information from being written to the external storage device, thus preventing information leakage. Moreover, it is possible to prevent infection by a computer virus occurring through the USB storage device and information leakage caused by such infection. The threat of information leakage occurring through an external storage device such as a USB storage device is common to all of the usage environments. Therefore, it is desirable to perform disablement of external storage device in all of the usage environments.

Setting items and setting values which are recommended for the respective usage environments, which are conceivable based on the above-described security measures, are shown in Table 2. In items the setting of which is recommended, recommended setting values, such as "on", "off", and "denied", are set forth. When the user selects a usage environment on a screen illustrated in FIG. 5B described below, a recommended setting value for the selected usage environment is applied.

Each of the image forming apparatuses 101 to 104 serving as an example of an information processing apparatus has a wide variety of setting items, such as setting items concerning security functions and the other setting items, and performs various types of control operations according to setting values corresponding to the respective setting items. Items targeted for collective setting of the security function are twenty-two items shown in Table 2.

TABLE 2

| | Intra-company environment | Internet direct connection environment | Internet prohibited environment |
|---|---|---|---|
| TLS setting | on | on | |
| WINS setting | off | off | |
| Default policy of IP address filter | | denied | |
| Exception address of IP address filter | | subnet address of image forming apparatus | |
| Cache storage of authentication password for external server | prohibited | prohibited | |
| Minimum number of letters of password | 8 letters | 8 letters | |
| Hard disk complete erasure | | | |
| SMB server setting | | off | |
| Use USB external storage device | off | off | off |
| Use LPD printing | | off | |
| Use RAW printing | | off | |
| Use WSD printing | | off | |
| Use IPP printing | | | |
| Use SNMPv1 | | off | |
| Use dedicated port | | off | |
| Automatic deletion of interrupted job | | | |
| Transmission result report | | | |
| Make sure to use password number when logging in | | | |
| Display job status obtained before authentication | | | |
| Display job history | | | |
| Acquire audit log | on | on | on |
| Storage of key operation log | on | on | on |

| | Teleworking environment | Public space environment | Highly confidential information management environment |
|---|---|---|---|
| TLS setting | on | on | on |
| WINS setting | off | off | off |
| Default policy of IP address filter | denied | denied | denied |
| Exception address of IP address filter | subnet address of image forming apparatus | subnet address of image forming apparatus | subnet address of image forming apparatus |
| Cache storage of authentication password for external server | prohibited | prohibited | prohibited |
| Minimum number of letters of password | 8 letters | 8 letters | 8 letters |
| Hard disk complete erasure | on | on | on |
| SMB server setting | | off | off |
| Use USB external storage device | off | off | off |
| Use LPD printing | off | off | off |
| Use RAW printing | off | off | off |
| Use WSD printing | off | off | off |
| Use IPP printing | | | on |
| Use SNMPv1 | off | off | off |
| Use dedicated port | | off | off |
| Automatic deletion of interrupted job | on | on | on |
| Transmission result report | off | off | off |

TABLE 2-continued

| | | | |
|---|---|---|---|
| Make sure to use password number at the time of simple login | on | on | on |
| Display job status obtained before authentication | off | off | off |
| Display job history | off | off | off |
| Acquire audit log | on | on | on |
| Storage of key operation log | on | on | on |

Each of Line Printer Daemon protocol (LPD), RAW protocol, Web Services for Devices (WSD), and Internet Printing Protocol (IPP) is a protocol used for printing to perform communication between a client device and a printer. With regard to IPP, since, unlike the other protocols, the protocol itself provides functions of user authentication, access control, and encryption of communication data, IPP is a print protocol safer than the other protocols. Therefore, in the highly confidential information management environment, in which high security is required, it is recommended to turn "on" the item "use IPP printing". Moreover, with regard to LPD, RAW, and WSD, each of which is weaker in security than IPP, except the intra-company environment and the Internet prohibited environment, each of which is a reliable environment, it is recommended to turn "off" the items "use LPD printing", "use RAW printing", and "use WSD printing", respectively.

SNMP is a protocol for monitoring and controlling a communication apparatus on a network, and allows, for example, the number of sheets printed by a printer and error information to be checked with use of a personal computer (PC). While Simple Network Management Protocol version 1 (SNMPv1) determines a communication range by information called a community name, since the community name is transmitted in plain text to a network, SNMPv1 is at risk of information leakage. Therefore, except the intra-company environment, which is a reliable environment, and the Internet prohibited environment, which is not connected to the Internet, it is recommended to turn "off" the item "use SNMPv1".

Dedicated port is a port which is used to set and refer to information about a printer transmitted from, for example, a printer driver. If the item "use dedicated port" is turned "off", when using, for example, a printer driver via a network connection, it becomes impossible to acquire information about a printer. In the Internet direct connection environment or the public space environment, each of which is at risk of information leakage, therefore, it is recommended to turn "off" the item "use dedicated port". Moreover, in the highly confidential information management environment, in which high security is required, it is also recommended to turn "off" the item "use dedicated port".

Automatic deletion of interrupted job is a function of automatically deleting a print job interrupted by, for example, error. This function is able to prevent a situation in which the interrupted print job resumes after an interval and the printed material then remains unattended after being printed, thus reducing the risk of information leakage. It is recommended to turn "on" the item "automatic deletion of interrupted job" in the teleworking environment and the public space environment, in each of which room entry management is not set, and the highly confidential information management environment, in which high security is required.

Transmission result report is a report for checking whether normal transmission to an intended destination has been performed. This report is an item for setting whether to automatically print a report of the transmission result of, for example, transmission of facsimile, e-mail, or Internet facsimile or storage into a file server or user box. Turning "off" the item "transmission result report" enables preventing a report in which information about, for example, the transmitted content or a transmission history is included from remaining unattended at the printer, thus reducing the risk of information leakage. It is recommended to turn "off" the item "transmission result report" in the teleworking environment and the public space environment, in each of which room entry management is not set, and the highly confidential information management environment, in which high security is required.

Simple login is a method of logging in by pressing a user name displayed on an operation panel and is a method capable of saving the effort of inputting a user name. In simple login, it is possible to set a password number. In the item "make sure to use password number at the time of simple login", it is possible to set whether to make sure to use a password number. While, in the case of not using a password number, the user is able to easily log in only by selecting a user name displayed on an operation panel, there is a danger of spoofing. Turning "on" the item "make sure to use password number at the time of simple login" enables reducing the risk of spoofing. It is recommended to turn "on" the item "make sure to use password number at the time of simple login" in the teleworking environment and the public space environment, in each of which room entry management is not set, and the highly confidential information management environment, in which high security is required.

The item "display job status obtained before authentication" is an item which is premised on the login service being used and which enables setting whether to perform displaying of a screen via which a job status is able to be checked before authentication. Turning "off" the item "display job status obtained before authentication" enables preventing a job status from being viewed by many and unspecified persons, thus reducing the risk of information leakage. It is recommended to turn "off" the item "display job status obtained before authentication" in the teleworking environment and the public space environment, in each of which room entry management is not set, and the highly confidential information management environment, in which high security is required.

The job history is a history which is recorded during execution of a print job, and includes information such as a user name of the user who has issued an instruction for printing and a document name of the printed document. Turning "off" the item "display job history" enables preventing information such as a document name or the user name of the user who has issued an instruction for printing the document from being viewed by many and unspecified persons, thus reducing the risk of information leakage. It is recommended to turn "off" the item "display job history" in the teleworking environment and the public space environment, in each of which room entry management is not set, and the highly confidential information management environment, in which high security is required.

With the audit log function being used, it is possible to audit an event of security. For example, it is possible to audit whether there is unauthorized access to an apparatus or a trial thereof by the log of user authentication and audit whether there is unauthorized use of an apparatus by a log obtained at the time of use of the apparatus such as a setting change. The key operation log is the log of a key operation which the user has performed, and includes, for example, a key operation log obtained during a login operation. Storing and analyzing these logs enables examining how the printer has been operated. Acquiring or storing the audit log or the key operation log enables preventing the user from negating when unauthorized access or unauthorized use has been performed. Since there is a risk of negation in any environment, these settings are settings which are recommended in common between the above-mentioned six environments.

Although not shown in Table 2, in the highly confidential information management environment, in which high security is required, setting items such as those described below can be added. For example, the additional setting items include "use Mopria", "use Airprint", and "use remote UI".

Moreover, in the teleworking environment, setting items such as those described below can be added. For example, the additional setting items include items concerning passwords of the administrator for Printer Job Language (PJL) and Embedded Web Server (EWS), SNMPv1/v2, and SNMPv3. For example, control is performed in such a manner that a device to which collective setting of the teleworking environment has been applied is not allowed to change the administrator password of PJL or EWS. SNMP is a device management protocol by which the administrator acquires or sets setting values of, for example, an image forming apparatus via a network. Since, if SNMP is able to be used, for example, changing of setting values of the functions of the image forming apparatus is able to be freely performed, the authorities required for the respective settings are also able to be managed. In order to prevent changing of settings from being performed by a general teleworking user after a group of setting values conforming to a policy determined by the company has been reflected, control can be performed in such a manner that, in the teleworking environment, settings of, for example, an authority concerning a device management protocol are also not allowed to be changed. Moreover, setting items concerning checking or updating of the version of firmware can also be added. Moreover, a setting item for selecting whether to limit access to a PJL command or a setting item concerning redirection to HTTPS can also be added.

Furthermore, the setting values are not limited to the values shown in Table 2, as long as the setting values are those adapted for the respective usage environments. For example, in Table 2, since a firewall is installed in the intra-company environment, setting of a personal firewall is made unnecessary. However, there can be a case where a firewall installed in the office and a personal firewall are used together. In such circumstances, even in the intra-company environment or the Internet prohibited environment, collective setting including setting of a personal firewall can also be performed. The same applies to the other setting items.

Out of the setting items shown in Table 2, for example, settings concerning TLS setting and a personal firewall are setting items concerning all aspects of a network. On the other hand, a setting item concerning a print protocol and an item concerning the function of an image forming apparatus, such as displaying of a print job history, or device management are setting items specific to an image forming apparatus.

The information processing apparatus according to the present exemplary embodiment has a function of, with use of the above-mentioned definition of environment classification and the recommended setting values of the security function as an example, collectively performing settings of recommended setting values adapted for the selected usage environment. This function is referred to as a "collective setting function". Additionally, the information processing apparatus according to the present exemplary embodiment has a function of setting a security policy according to the security course of action of the organization and setting the setting values conforming to the set security policy. This function is referred to as a "security policy function". In the following description, the security policy function is described.

Each of the image forming apparatuses 101 to 104 serving as an example of an information processing apparatus has security-related settings corresponding to the security policy. Some target items for settings of the security function corresponding to the security policy in the first exemplary embodiment are shown in Table 3.

TABLE 3

| Security policy | Setting item | Setting value |
|---|---|---|
| Prohibit plain text authentication in server function | TLS setting | on |
| Prohibit cache storage of password to external server | cache storage of authentication password for external server | prohibited |
| Set minimum number of letters of password | minimum number of letters of password | 8 letters |
| Force complete erasure of data | completely erase hard disk | on |
| Limit SMB port | SMB server setting | off |
| Prohibit use of USB external storage device | use USB external storage device | off |
| Limit LPD port | use LPD printing | off |
| Limit RAW port | use RAW printing | off |
| Limit WSD port | use WSD printing | off |
| Limit IPP port | use IPP printing | off |
| Prohibit use of SNMPv1 | use SNMPv1 | off |
| Limit dedicated port | use dedicated port | off |
| Force recording of audit log | acquire audit log | on |
| | displaying of job history | on |
| | acquire operation log | on |
| | display user name of print job as login name | on |

TABLE 3-continued

| Security policy | Setting item | Setting value |
|---|---|---|
| Prohibit use of wireless LAN | selection of wired or wireless LAN | wired LAN |
| Display warning at the time of use of default password | display warning at the time of use of default password | on |
| Prohibit immediate printing of received job | use facsimile memory reception | on |
|  | use I facsimile memory reception | on |
|  | forced hold printing | on |
|  | printing at the time of storage from printer driver | off |
| Allow transmission only to destination registered with address book | limitation of new destination (facsimile, e-mail, I facsimile, or file) | on |

Figure 6A:
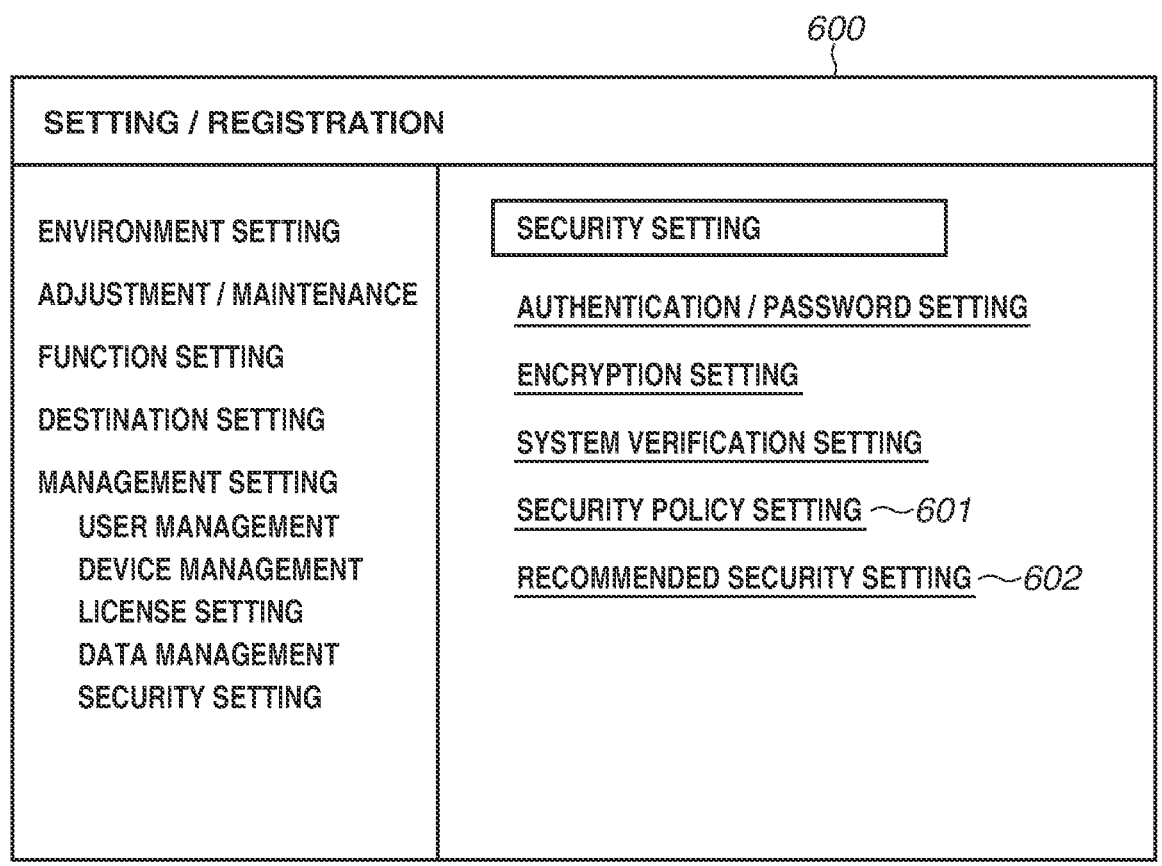
FIGS. 6A and 6B are diagrams each illustrating an example of a screen which is displayed on a web user interface (UI) of the image forming apparatus in the first exemplary embodiment.
Figure 6B:
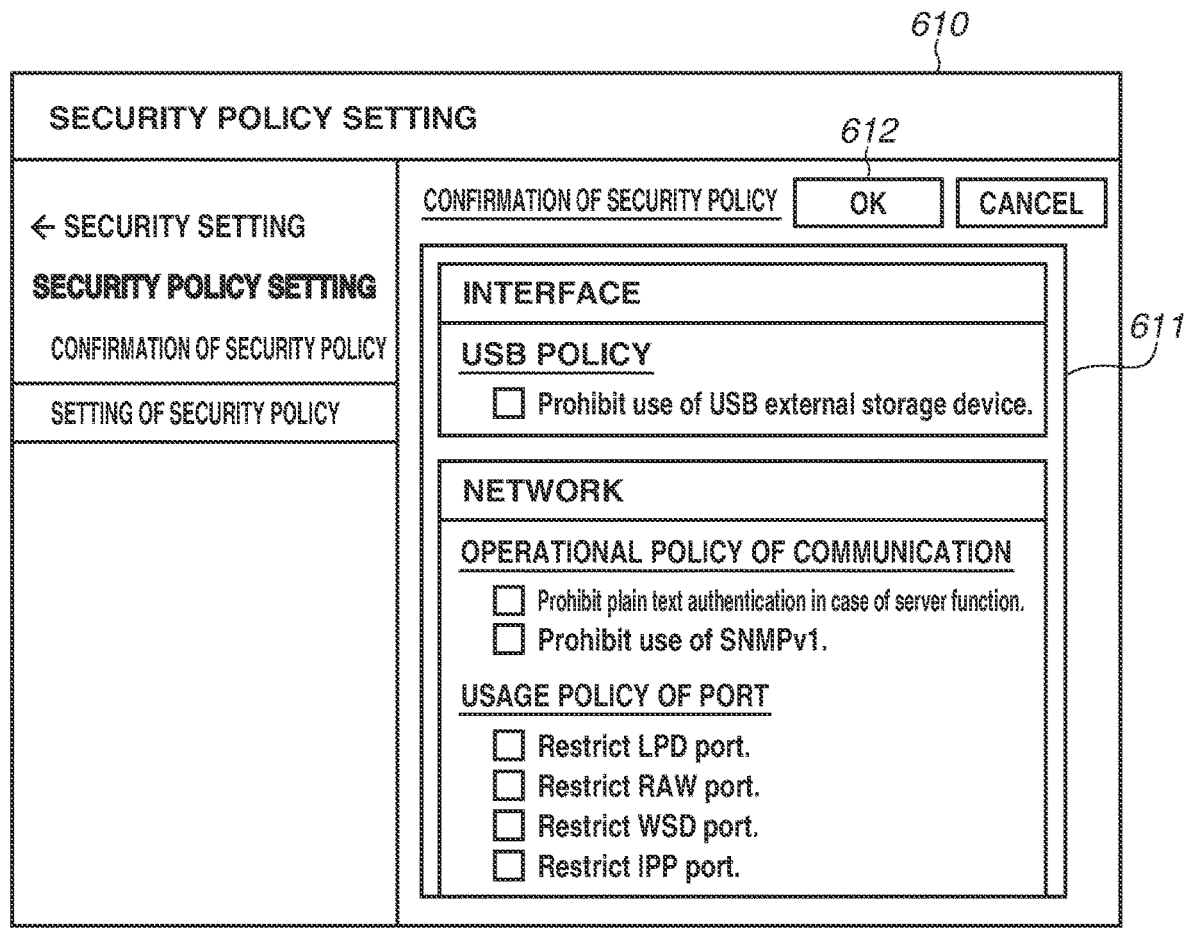

In a security policy setting screen 610 in which a plurality of security policies is displayed, illustrated in FIG. 6B, the user is able to perform setting of a security policy by inputting a check to the security policy to be set. In response to an OK button 612 being pressed, a setting value conforming to the security policy is set to the information processing apparatus. The security policy function is able to be used to set, to the information processing apparatus, a setting value conforming to the security course of action of the organization to which the user belongs.

The security policy which has been set at the information processing apparatus is able to be applied as an export to another information processing apparatus. Moreover, a security policy which has been set at another information processing apparatus is able to be imported and applied to the user's information processing apparatus. Additionally, a security policy which has been edited by device management software is able to be imported and applied to the information processing apparatus.

In the first exemplary embodiment, setting of a security policy is made able to be performed by only some administrators having strong authority out of administrators of the information processing apparatus. On the other hand, use of a collective setting function is made able to be performed by even other administrators.

Table 3 shows an example of security policies which are able to be set by the image forming apparatus 101. The first column indicates security policies which are displayed in the screen 610. The second column and the third column indicate setting items and setting values corresponding to the respective security policies in the first column, respectively. For example, in a case where the user has set a security policy "limit LPD port", for the purpose of limiting a printing protocol to be used, the setting item "use LPD printing" is set to "off". Moreover, for example, in a case where the user has set a security policy "force recording of audit log", the setting items "acquire audit log", "displaying of job history", "acquire operation log", and "display user name of print job as login name" are set to "on".

Thus far is the description of the collective setting function, which sets a recommended setting value adapted for the selected usage environment, and the security policy function, which sets a setting value associated with the set security policy. Setting items corresponding to setting values which are set by the respective functions are partially common to each other.

In the first exemplary embodiment, fourteen setting items shown on the upper side of Table 3, which are examples of setting of the security policy function, are in common with the collective setting function shown in Table 2. In other words, "TLS setting" in the first row to "displaying of job history" in the fourteenth row are setting items which are also included in Table 2. Among them, with regard to setting items other than "use IPP printing" and "displaying of job history", setting values to be set are set common between both functions. The setting value corresponding to the setting item "use IPP printing" is set to "on" in the case of the collective setting function and is set to "off" in the case of the security policy function. Moreover, the setting value corresponding to the setting item "displaying of job history" is set to "off" in the case of the collective setting function and is set to "on" in the case of the security policy function. Moreover, there are also a setting item which is targeted only in the case of the collective setting function and a setting item which is targeted only in the case of the security policy function. For example, settings concerning an IP address filter, "automatic deletion of interrupted job", and "transmission result report" are included as setting items targeted for the collective setting function, but are not included as setting items targeted for the security policy function. Moreover, the setting items "acquire operation log" in the fifteenth row of Table 3 to "limitation of new destination" in the twenty-fourth row thereof, which are targeted for the security policy function, are not set as setting items targeted for the collective setting function.

Furthermore, the setting items targeted for the security policy function shown in Table 3 and the setting items targeted for the collective setting function shown in Table 2 are merely examples, and the first exemplary embodiment is not limited to these examples. For example, a setting item which is included in only the security policy function in the first exemplary embodiment, such as the setting item "acquire operation log", can be configured to be also included in the collective setting function.

Here, the details of setting items which are included in the setting items shown in Table 3 but have not been described with reference to Table 2 are described. The setting item "acquire operation log" is an item for setting whether to record a log of the user operation. The setting item "display user name of print job as login name" is an item for setting whether to display the user name of a print job for printing by direct connection as a login name.

The setting item "selection of wired or wireless LAN" enables selecting an interface to be used between a wired LAN and a wireless LAN. Selecting the setting value "wired LAN" enables prohibiting the use of a wireless LAN.

Setting the setting value of the setting item "display warning at the time of use of default password" to "on" enables performing such a setting that, if a password which has been set at the time of purchase of the image forming apparatus is used, a warning message is displayed.

Setting the setting value of the setting item "use facsimile memory reception" or "use I facsimile memory reception" to "on" enables performing such a setting that the received document is not immediately printed but is temporarily stored in a storage location of the image forming apparatus.

Setting the setting value of the setting item "forced hold printing" to "on" enables performing such a setting that, at the time of printing a document transmitted from a PC, print data is caused not to be immediately printed. Such setting enables reducing a risk in which the printed document is viewed by anyone else or is taken by mistake.

The setting item "printing at the time of storage from printer driver" enables setting whether to, when having stored a file from a printer driver, simultaneously print one copy. Setting the setting value of the setting item "printing at the time of storage from printer driver" to "off" enables performing such a setting that, when a file has been stored from a printer driver, printing is not simultaneously performed.

Setting the setting value of the setting item "limitation of new destination" to "on" enables performing such a setting that, when facsimile or scan data is transmitted, a destination is not allowed to be designated by character entering, so that it is possible to perform transmission to only destinations which are previously registered with an address book. The setting item "limitation of new destination" is divided into four subitems "facsimile", "e-mail", "I facsimile", and "file", and, in each subitem, the setting value thereof is allowed to be set to "on" or "off".

In the first exemplary embodiment, an image forming apparatus capable of preventing a conflict of settings from occurring in controlling a setting item that is based on the environment classification and a setting item that is based on the security policy is provided.

In the following description, the image forming apparatus 101 is specifically described.

<Hardware Configuration of Image Forming Apparatus 101>

Figure 3:
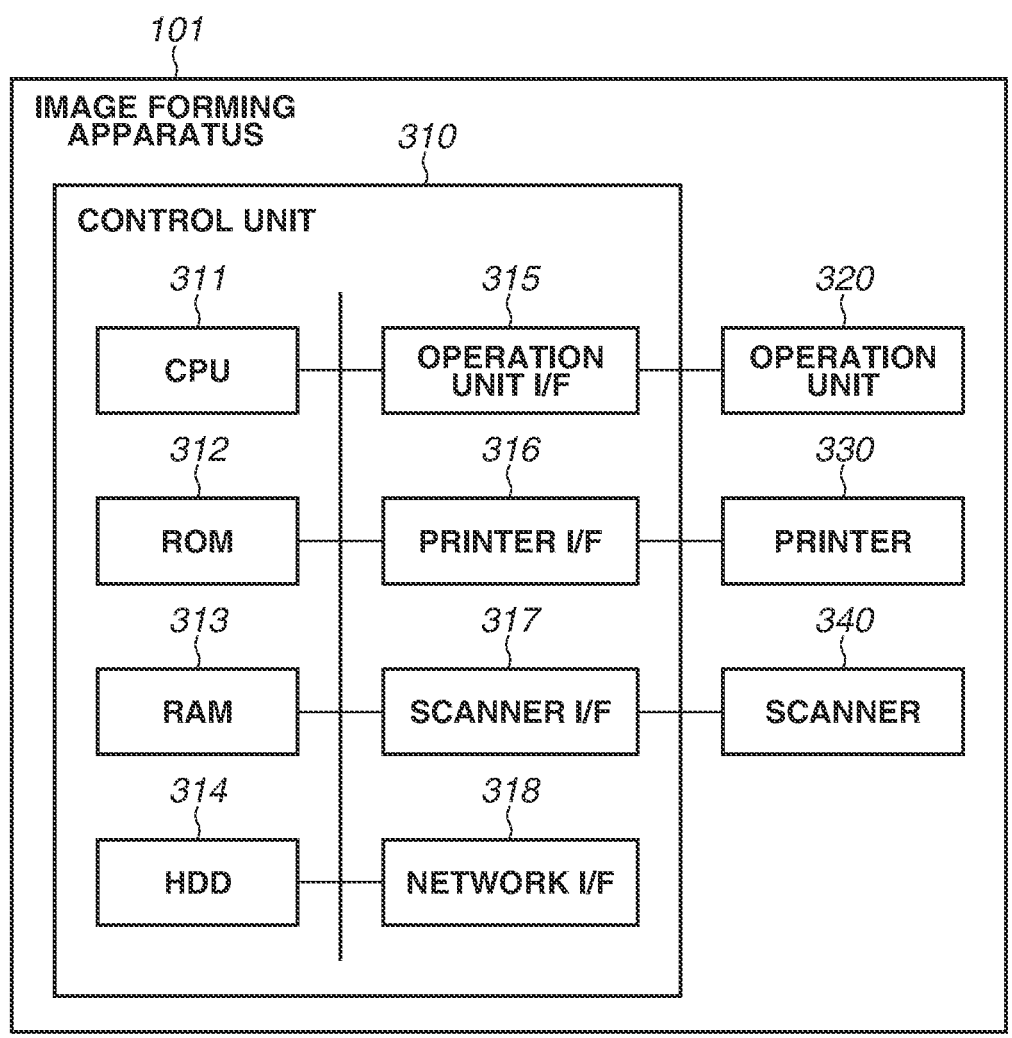
FIG. 3 is a diagram illustrating an example of a hardware configuration of an image forming apparatus.

A hardware configuration of the image forming apparatus 101, which is an example of the information processing apparatus in the first exemplary embodiment, is described with reference to FIG. 3. Furthermore, while, in FIG. 3, only the image forming apparatus 101 is described, each of the image forming apparatuses 102 to 104 and an image forming apparatus (not illustrated) installed in the public space environment or the highly confidential information management environment is assumed to have a configuration similar to that of the image forming apparatus 101.

The image forming apparatus 101 includes a printer 330, which outputs electronic data to a paper medium, and a scanner 340, which reads a paper medium to perform conversion into electronic data. While, in the first exemplary embodiment, an image forming apparatus 101 having a plurality of functions is illustrated as an example of the information processing apparatus, the first exemplary embodiment is not limited to this. For example, the information processing apparatus can be an apparatus such as a single-function printer or scanner, a three-dimensional (3D) printer, or a 3D scanner. Moreover, the information processing apparatus can be an apparatus such as a personal computer which is managed in conformity with a security policy.

A control unit 310, which includes a central processing unit (CPU) 311, controls the overall operation of the image forming apparatus 101. A read-only memory (ROM) 312 is used to store a program which the CPU 311 executes. The CPU 311 reads out a control program stored in the ROM 312 and performs various control operations for the image forming apparatus 101, such as reading control and transmission control. A random access memory (RAM) 313 is used as a temporary storage region such as a main memory or work area for the CPU 311. A hard disk drive (HDD) 314 is a storage device which stores image data, various programs, and various piece of setting information. Furthermore, another type of storage device such as a solid state drive (SSD) can be included in the image forming apparatus 101. In this way, hardware including, for example, the CPU 311, the ROM 312, the RAM 313, and the HDD 314 constitutes what is called a computer.

An operation unit interface (I/F) 315 interconnects an operation unit 320 and the control unit 310.

The operation unit 320 includes, for example, a liquid crystal display portion having a touch panel function and various hardware keys. The operation unit 320 functions as a display unit, which displays information to the user, and a reception unit, which receives an instruction of the user.

A printer I/F 316 interconnects the printer 330 and the control unit 310. Image data to be printed by the printer 330 is transferred from the control unit 310 via the printer I/F 316. The input image data is output onto a recording medium by the printer 330. A scanner I/F 317 interconnects the scanner 340 and the control unit 310. The scanner 340 reads an original placed on a document positioning plate (not illustrated) to generate image data. The generated image data is input to the control unit 310 via the scanner I/F 317.

A network I/F 318, to which a network cable is connected, is able to perform communication with an external apparatus present on the LAN 131. While, in the first exemplary embodiment, the network I/F 318 is assumed to be a communication interface for performing wired communication, the first exemplary embodiment is not limited to this. For example, the network I/F 318 can be a wireless communication interface. Furthermore, while the network I/F 318 of the image forming apparatus 101 is connected to the LAN 131, a network connected to the network I/F 318 varies depending on a usage environment.

For example, the image forming apparatus 102 is connected directly to the Internet 100. The image forming apparatuses 103 and 104 are connected to the LANs 133 and 134, respectively.

<Software Configuration of Image Forming Apparatus 101>

Figure 4:
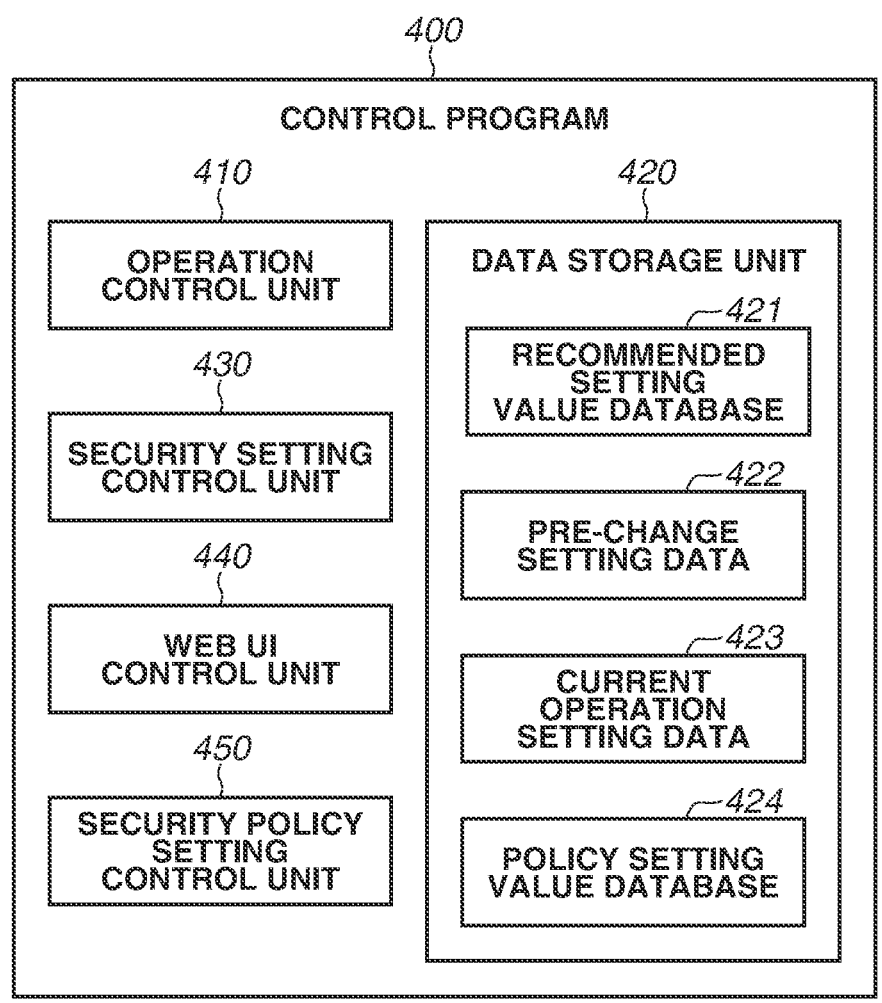
FIG. 4 is a diagram illustrating an example of a software configuration of the image forming apparatus.

Next, a software configuration of the image forming apparatus 101, which is an example of the information processing apparatus in the first exemplary embodiment, is described with reference to FIG. 4. Each unit illustrated in FIG. 4 is implemented by the CPU 311 executing a control program 400 stored in the ROM 312 and corresponding to each unit.

An operation control unit 410 displays a screen directed to the user on the operation unit 320. Moreover, the operation control unit 410 detects an operation performed by the user and switches a screen or updates displaying based on a result of detection.

A data storage unit 420 stores data in the HDD 314 or reads out data from the HDD 314 according to a request from another control unit. The data storage unit 420 stores, in addition to setting information for determining operations of the image forming apparatus 101, information concerning setting of the security function. Specifically, the data storage unit 420 stores a recommended setting value database 421, pre-change setting data 422, current operation setting data 423, and a policy setting value database 424.

The recommended setting value database 421 is a database such as that shown in the above-described Table 2. In other words, the recommended setting value database 421 is a database in which combinations of setting items and setting values of the security function adapted for a usage environment of the image forming apparatus 101 are associated with a plurality of divided usage environments. Here, the setting item is an item such as TLS setting or WINS setting. The setting value is a value shown as, for example, "on", "off", or "denied" in Table 2. In Table 2, a setting item the setting value of which is blank and is indicated by a slash indicates that there is no recommended setting value.

Thus, a setting value concerning such a setting item is not changed, so that a setting value set before the setting change is continued.

In the first exemplary embodiment, the recommended setting value database 421 is previously defined by the vendor of the image forming apparatus 101 and is stored in the data storage unit 420.

The pre-change setting data 422 is data about a combination of the setting item and setting value which have been applied before the user selects an environment type in a screen 510 illustrated in FIG. 5B described below. Here, the setting item which is stored in the pre-change setting data 422 is a setting item corresponding to a setting value which is changed by selection of the environment type. In other words, in the first exemplary embodiment, setting items in the pre-change setting data 422 which are stored in a case where, for example, the Internet prohibited environment is selected are three setting items "use USB external storage device", "acquire audit log", and "storage of key operation log". The setting values which correspond to the three setting items and have been applied before environment selection are stored in the pre-change setting data 422. Basically, when a security setting control unit 430 described below has performed collective setting, in a case where a problem in which, for example, an operation setting performed after collective setting does not enable a function which the user desires to be used has occurred, the pre-change setting data 422 is used to restore the setting value. In the first exemplary embodiment, when an environment type is selected for the first time in the image forming apparatus 101 or when an environment type is selected for the first time after a setting cancel button 513 described below is pressed, the pre-change setting data 422 is stored. In other words, in a case where the user successively selects an environment type, the pre-change setting data 422 is never updated.

The policy setting value database 424 is a database in which the setting item and setting value of the security function associated with the security policy are combined with each other. Table 3 is an example of the policy setting value database 424. The policy setting value database 424 is previously defined by the vendor of the image forming apparatus 101 and is stored in the data storage unit 420.

The current operation setting data 423 is data concerning setting values which are currently applied to the image forming apparatus 101. For example, data about a combination of the setting item and setting value of the security function is included in the current operation setting data 423. When the setting item of the security function is changed by the security policy function or the collective setting function or when the user separately changes the setting value, the current operation setting data 423 is rewritten. After that, in response to the image forming apparatus 101 being restarted, the current operation setting data 423 which has been rewritten is read out by the program, so that the image forming apparatus 101 is caused to operate with the applied setting.

Moreover, the current operation setting data 423 also includes information indicating whether each security policy shown in the first column of Table 3 is currently set. When an OK button 612 is selected by the user in a screen 610 described below, with regard to a policy which is already selected at the stage of the OK button 612 being selected, the selected policy is determined to be currently set and information indicating that effect is then stored in the current operation setting data 423. With regard to a policy which is not currently selected, the policy is determined not to be currently set and information indicating that effect is then stored in the current operation setting data 423. Moreover, in a case where a security policy is imported into and set in the image forming apparatus 101, information indicating whether each policy is currently set is also stored in the current operation setting data 423 based on the setting of the imported security policy.

Additionally, the current operation setting data 423 also includes information concerning the usage environment of the image forming apparatus 101. In default configuration, as such information, information indicating that no usage environment is currently selected is stored. When an environment type is selected by the user on a screen 510 described below and an execution button 512 is pressed, the information is overwritten. Information indicating an environment type which has been selected from among usage environment list buttons 511 is stored in the current operation setting data 423 as information indicating a usage environment of the image forming apparatus 101.

The security setting control unit 430 performs setting of the security function of the image forming apparatus 101 according to an instruction from the user detected by the operation control unit 410. In a case where an environment type has been selected in the screen 510 and the execution button 512 has been pressed, setting values associated with the selected usage environment are collectively set to the image forming apparatus 101. This is referred to as a "collective setting function". Moreover, it is possible for the user to separately input setting of the security policy via an individual setting screen (not illustrated). The security setting control unit 430 also sets, to the image forming apparatus 101, the setting values separately input by the user. Furthermore, setting of the security function by the security policy function is performed by a security policy setting control unit 450 described below.

The collective setting function in the first exemplary embodiment is a function capable of collectively setting typical recommended setting values of the security function defined by the vendor. The security policy function is a function of applying a security policy edited by the administrator and setting the setting values associated with the security policy. In the security policy function, it is prohibited to separately change a setting value which has been set based on the security policy. On the other hand, in the case of the collective setting function, even when having performed collective setting with use of the collective setting function, the user such as an administrator is allowed to change the setting value of an individual setting item again to another setting value via an individual setting change screen (not illustrated) depending on the actual usage situation.

The security policy setting control unit 450 performs security policy setting of the image forming apparatus 101 according to an instruction from the user detected by the operation control unit 410. In a case where one or more security policies have been selected in the screen 610 and the OK button 612 has been pressed, the setting values associated with the respective selected security policies are set to the image forming apparatus 101. This is referred to as a "security policy function". As mentioned above, the security policy function is a function of applying a security policy edited by the user and prohibiting changing the setting of a specific security setting item to a setting which does not accord with the security policy.

A web user interface (UI) control unit 440 performs control of a setting screen which is displayed on an external information processing apparatus such as the PC 121 via the network I/F 318. The user is allowed to refer to and change the setting of the image forming apparatus 101 via a method illustrated in FIGS. 6A and 6B with use of a setting screen on a web browser provided by the web UI control unit 440.

Next, a setting screen 500 and a setting screen 510 each of which is displayed on the operation unit 320 of the image forming apparatus 101 are described with reference to FIGS. 5A and 5B, respectively. Furthermore, while, here, the setting screen 500 and the setting screen 510, each of which is displayed on the operation unit 320 of the image forming apparatus 101, are described, the first exemplary embodiment is not limited to this. For example, a configuration in which a web page similar to the setting screen 500 is provided to a web browser of an external information processing apparatus with use of the web UI control unit 440 and a setting operation is performed via the web page can be employed. For example, an example of a screen which is displayed on the web page and which is equivalent to the screen illustrated in FIG. 5A is illustrated in FIG. 6A.

Figure 5A:
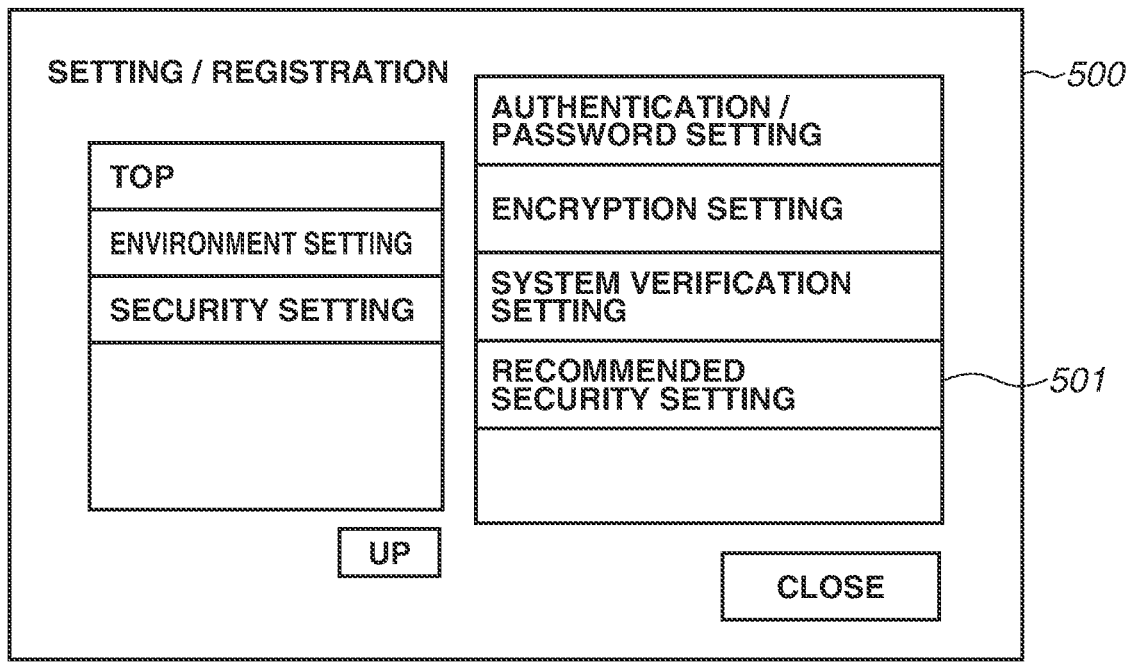
FIGS. 5A and 5B are diagrams each illustrating an example of a screen which is displayed on an operation unit of the image forming apparatus in a first exemplary embodiment.

Referring to FIG. 5A, the setting screen 500 is a screen which the operation control unit 410 displays on the operation unit 320. A recommended security setting menu button 501 is a button used for transitioning to a setting screen which the user uses to perform collective setting. The user is able to press the recommended security setting menu button 501 to cause the setting screen 510 used for performing collective setting to be displayed.

Figure 5B:
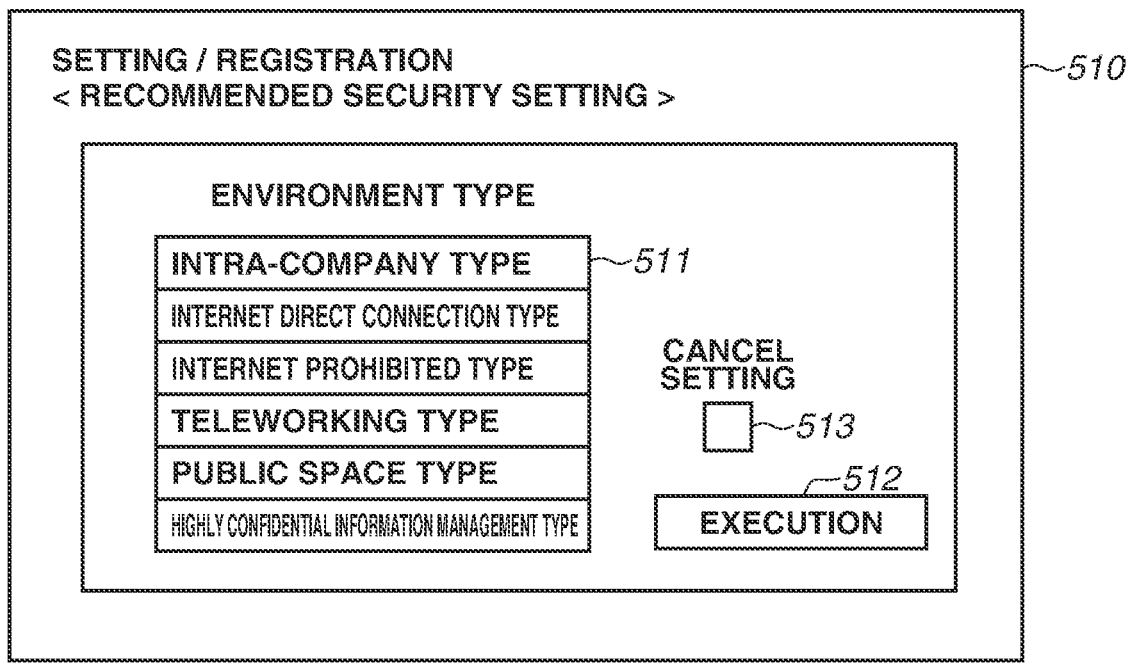

Referring to FIG. 5B, the setting screen 510 is a screen which the operation control unit 410 displays on the operation unit 320. The usage environment list buttons 511 are buttons which the user uses to select a usage environment. On the setting screen 510, the user performs an operation of selecting a usage environment of the image forming apparatus 101 from among the usage environment list buttons 511 and pressing the execution button 512. In the first exemplary embodiment, the user selects from among six options for usage environments illustrated in FIG. 2. The operation control unit 410 of the image forming apparatus 101 detects an operation performed by the user and transmits information indicating a result of selection performed by the user to the security setting control unit 430. The security setting control unit 430 collectively performs setting of the security function adapted for the usage environment selected by the user.

The setting cancel button 513 is a button which, after collective setting of the security function is performed, the user uses to cancel the collective setting. While selecting the setting cancel button 513, the user performs an operation of pressing the execution button 512. The operation control unit 410 detects an operation performed by the user and transmits information indicating a setting cancel instruction from the user to the security setting control unit 430.

Upon receiving the information indicating a setting cancel instruction, the security setting control unit 430 cancels collective setting of the security function and resumes the original setting. Specifically, the security setting control unit 430 overwrites setting items corresponding to the current operation setting data 423 with the pre-change setting data 422 stored in the data storage unit 420. It is possible that, after the user has performed selection of a usage environment and collective setting of the security function has been performed, an issue arises in the use of the image forming apparatus 101. In such a case, including the setting cancel button 513 enables resuming the state obtained before collective setting and thus dealing instantly with the issue.

Next, a setting screen 600 and a setting screen 610 of the web UI which the web UI control unit 440 provides to a web browser of an external information processing apparatus are described with reference to FIGS. 6A and 6B, respectively. Furthermore, while, in the first exemplary embodiment, the setting screen 600 and the setting screen 610 of the web UI are described, the first exemplary embodiment is not limited to this. For example, a setting screen which is displayed on the operation unit 320 of the image forming apparatus 101 can be employed.

Referring to FIG. 6A, the setting screen 600 is a screen of the web UI which the web UI control unit 440 provides to a web browser of an external information processing apparatus.

A security policy setting menu button 601 is a button used for transitioning to the setting screen 610, which is used for performing setting of the security policy. The user is able to press the security policy setting menu button 601 to cause the setting screen 610 to be displayed, thus enabling performing setting of the security policy. The details of the setting screen 610 are described below with reference to FIG. 6B.

A recommended security setting menu button 602 is a button used for transitioning to a setting screen (not illustrated) equivalent to the setting screen 510, which the user uses to perform collective setting. The user is able to press the recommended security setting menu button 602 to cause a setting screen (not illustrated) equivalent to the setting screen 510 used for performing collective setting to be displayed on the web UI.

Referring to FIG. 6B, the setting screen 610 is a screen of the web UI which the web UI control unit 440 provides to a web browser of an external information processing apparatus. Security policy list buttons 611 are a group of buttons which the user uses to select a security policy of the image forming apparatus 101. The user performs an operation of selecting a security policy of the image forming apparatus 101 from among the security policy list buttons 611 on the setting screen 610 and pressing an OK button 612. In the first exemplary embodiment, the user selects from among setting items of the security policies shown in Table 3. The operation control unit 410 of the image forming apparatus 101 detects an operation performed by the user and transmits information indicating a result of selection performed by the user to the security policy setting control unit 450. The security policy setting control unit 450 performs setting of the security function adapted for the security policy selected by the user, which has been received from the operation control unit 410, thus limiting the function which the user is allowed to use in the image forming apparatus 101.

Next, processing which is performed from when the user selects a security policy on the screen 610 to when security policy setting is performed is described with reference to FIG. 7.

Each operation (step) illustrated in the flowchart of FIG. 7 is performed by the CPU 311 reading out a program for implementing each control unit stored in the ROM 312 or the HDD 314 onto the RAM 313 and executing the program.

When the security policy setting control unit 450 supplies, via the web UI control unit 440, the setting screen 610 to a web browser of the PC 121, which is an external apparatus, processing illustrated in FIG. 7 starts.

In step S701, the security policy setting control unit 450 determines whether an instruction for setting of a security policy has been received. Specifically, first, the PC 121 displays the setting screen 610 provided from the security policy setting control unit 450 on the web browser of the PC 121, and waits to receive an operation performed by the user. When the user performs an operation on the setting screen 610, the PC 121 receives the operation. When the PC 121 receives information indicating that a security policy has been selected by the user and the OK button 612 has been pressed, the PC 121 transmits information indicating whether each security policy has been selected to the image forming apparatus 101. The image forming apparatus 101 stores the received information in the current operation setting data 423 included in the data storage unit 420. Then, in a case where one or more security policies have been selected, the security policy setting control unit 450 determines that an instruction for setting of a security policy has been received. If it is determined that an instruction for setting of a security policy has been received (YES in step S701), the security policy setting control unit 450 advances the processing to step S702, and, if it is determined that the instruction has not been received (NO in step S701), the security policy setting control unit 450 repeats step S701 to wait for reception. Furthermore, the security policy setting control unit 450 can determine that an instruction for security policy setting has been received not in response to setting being performed on the screen 610 but in response to a security policy delivered from another image forming apparatus or device management software being imported. In a case where a security policy has been imported, likewise, setting of the imported security policy is then stored in the data storage unit 420.

In step S702, the security policy setting control unit 450 performs setting of security-related items corresponding to the received security policy setting. The security policy setting control unit 450 performs the setting by writing, in the current operation setting data 423, the setting items and setting values stored in the policy setting value database 424. Specifically, the security policy setting control unit 450 refers to the information received from the PC 121 in step S701, and extracts the selected security policy. Then, the security policy setting control unit 450 refers to the policy setting value database 424, and extracts the setting item and setting value associated with the selected security policy. The security policy setting control unit 450 changes a setting value corresponding to the extracted setting item stored in the current operation setting data 423 to the extracted setting value stored in the policy setting value database 424. With the above-mentioned processing, the security policy setting control unit 450 sets a setting value corresponding to the security policy selected in the screen 610 to the image forming apparatus 101. Moreover, with respect to a function the use of which has been restricted by the above setting, the security policy setting control unit 450 performs display control in such a manner that the user is unable to change the function to an available state. Specifically, the security policy setting control unit 450 performs control in such a manner that the user is unable to perform an operation of individually changing a setting value of the setting item corresponding to the selected security policy on a setting screen displayed on the operation unit 320 of the image forming apparatus 101 and a setting screen of the web UI. Furthermore, in a case where the security policy setting received by the security policy setting control unit 450 is an instruction for cancelling a security policy, the security policy setting control unit 450 performs the following control. The security policy setting control unit 450 performs control in such a manner that the user is able to perform an operation of individually changing a setting value of the setting item corresponding to the security policy on a setting screen displayed on the operation unit 320 of the image forming apparatus 101 and a setting screen of the web UI.

Furthermore, while, in the first exemplary embodiment, the operations have been described with use of an operation performed on the web UI, another configuration using a setting screen which is displayed on the operation unit 320 can be employed.

With the above-described processing, the user is enabled to perform setting of security-related items corresponding to setting of a security policy to the image forming apparatus 101.

Next, processing for determining whether a security policy is currently set and performing displaying of a setting screen for collective setting taking into account a conflict operation which occurs in a case where a security policy is applied is described with reference to FIG. 8.

Each operation (step) illustrated in the flowchart of FIG. 8 is performed by the CPU 311 reading out a program for implementing each control unit stored in the ROM 312 or the HDD 314 onto the RAM 313 and executing the program.

When the image forming apparatus 101 starts up and the operation control unit 410 becomes ready to receive an instruction for displaying the setting screen 500 on the operation unit 320 or an instruction for providing the setting screen 600 via the web UI control unit 440, processing illustrated in FIG. 8 starts. Furthermore, while, in the first exemplary embodiment, a configuration in which the operation control unit 410 receives an instruction for displaying the setting screen 500 on the operation unit 320 is described as an example, another configuration in which, for example, the operation control unit 410 receives an instruction for providing the setting screen 600 via the web UI control unit 440 can be employed.

In step S801, the operation control unit 410 determines whether an instruction for displaying the setting screen 500 on the operation unit 320 has been received. If it is determined that the instruction for displaying the setting screen 500 has been received (YES in step S801), the operation control unit 410 advances the processing to step S802. The instruction for displaying the setting screen 500 is, specifically, a button for displaying the setting screen 500 being pressed on another screen (not illustrated) which is being displayed on the operation unit 320. If the operation control unit 410 detects that the button has been pressed, the operation control unit 410 determines that the instruction for displaying the setting screen 500 has been received. Furthermore, in the case of a configuration in which the setting screen 600 is displayed on the web browser of the PC 121 via the web UI control unit 440, step S801 is performed by the web UI control unit 440. First, the PC 121 detects that a button for displaying the setting screen 600 has been pressed on another screen (not illustrated) which is being displayed on the web browser. Then, the web UI control unit 440 of the image forming apparatus 101 receives information indicating that effect as an instruction for displaying the setting screen 600.

In step S802, the operation control unit 410 reads out setting information from the current operation setting data 423, and determines whether a security policy is currently set. The setting information to be read out here is information indicating whether each security policy is currently set, which is stored in the current operation setting data 423. The operation control unit 410 determines whether one or more security policies are currently set, based on the read-out information. In a case where it is determined that one or more security policies are currently set, the operation control unit 410 determines that a security policy is currently set. In a case where any security policy is not currently set, the operation control unit 410 determines that no security policy is currently set. If it is determined that a security policy is currently set (YES in step S802), the operation control unit 410 advances the processing to step S803. On the other hand, if it is determined that no security policy is currently set (NO in step S802), the operation control unit 410 advances the processing to step S804.

In step S803, to restrict the use of collective setting since a security policy is currently set, the operation control unit 410 changes the recommended security setting menu button 501 to a state of being unable to be used by the user. To implement the state of being unable to be used by the user, in the first exemplary embodiment, the operation control unit 410 performs shading on the recommended security setting menu button 501 to bring the recommended security setting menu button 501 into a state of not accepting a user operation. In other words, after displaying the button 501 in gray in step S804, the operation control unit 410 performs, in step S803, processing for gray-out in such a way as to make the button 501 unable to be pressed. After shading on the recommended security setting menu button 501 is finished, the operation control unit 410 advances the processing to step S804.

Figure 9A:
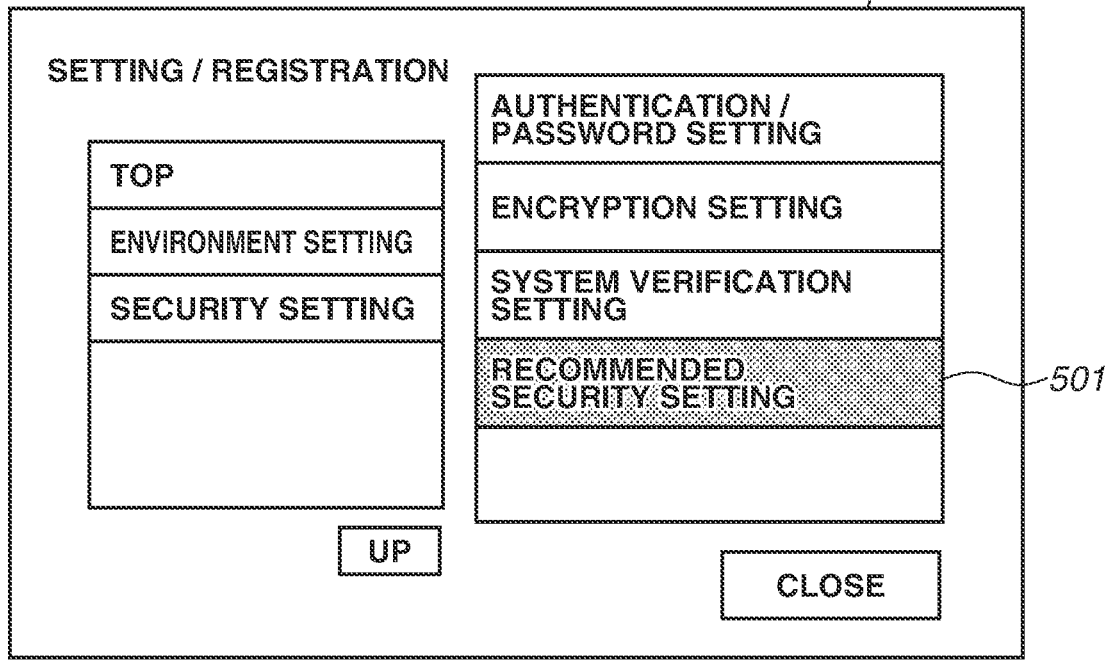
FIGS. 9A and 9B are diagrams each illustrating an example of a screen which is displayed on the operation unit or the web UI of the image forming apparatus in the first exemplary embodiment.

In step S804, the operation control unit 410 displays a setting screen taking into account a conflict operation between security policy setting and collective setting. In other words, in a case where, in step S802, it is determined that a security policy is currently set, the operation control unit 410 displays, on the operation unit 320, a security setting screen which is in a state of shading being performed on the button 501. FIG. 9A illustrates an example of such a security setting screen. Moreover, in a case where, in step S802, it is determined that no security policy is currently set, the operation control unit 410 displays, on the operation unit 320, a setting screen 500 in which shading is not performed on the button 501. Furthermore, the configuration of a setting screen taking into account a conflict operation between security policy setting and collective setting is not limited to the configuration illustrated in FIG. 9A. In step S804, after performing gray-out displaying by making the color of characters "recommended security setting" displayed on the button 501 pale in gray, the operation control unit 410 can perform displaying in such a way as to make the button 501 unable to be pressed. Moreover, a configuration in which a screen which is in a state of not displaying the recommended security setting menu button 501 is provided can also be employed. Alternatively, after performing displaying in such a way as to make the recommended security setting menu button 501 able to be selected by the user, the operation control unit 410 can perform display control in such a way as to make an operation on the screen 510 unable to be performed by the user. For example, when detecting that the user has pressed the recommended security setting menu button 501, the operation control unit 410 displays a pop-up without displaying the screen 510. Here, the operation control unit 410 displays, in the pop-up, a message indicating that it is impossible to use the function of recommended security setting. In step S803, the operation control unit 410 only needs to perform processing for displaying a setting screen taking into account a conflict operation between security policy setting and collective setting in step S804. Moreover, the operation control unit 410 performs displaying in such a way as to make the recommended security setting menu button 501 able to be selected by the user. Then, in a case where a usage environment has been selected by the user in the screen 510, the security setting control unit 430 sets, to the image forming apparatus 101, only a recommended setting value corresponding to a setting item which does not overlap with the setting of a security policy. Such a configuration can be employed. Specifically, the security setting control unit 430 compares a setting item of the recommended setting corresponding to the selected usage environment, included in the recommended setting value database 421 stored in the data storage unit 420, with a setting item included in the policy setting value database 424. Then, the security setting control unit 430 extracts a different setting item. The security setting control unit 430 sets, to the image forming apparatus 101, a recommended setting value stored in association with the extracted setting item as a setting value of the setting item concerned.

With the above-described processing, it is possible to, depending on a setting status of a security policy to the image forming apparatus 101, present a setting screen taking into account a conflict operation between security policy setting and collective setting to the user.

Next, a setting screen in a case where a security policy is currently set is described with reference to FIGS. 9A and 9B.

FIG. 9A is a diagram illustrating, as an example, a setting screen 900 which is displayed in a case where a conflict operation is taken into account in a case where a security policy is currently set with respect to the setting screen 500. In other words, the setting screen 900 is a setting screen which is displayed in a case where shading has been performed on the recommended security setting menu button 501 in step S803 illustrated in FIG. 8.

In a case where the setting of a security policy to be prioritized is performed by bring about a state in which an instruction for displaying the setting screen 510 is not issued due to shading being performed on the recommended security setting menu button 501, a state in which it is impossible to use the function of collective setting is brought about.

Figure 9B:
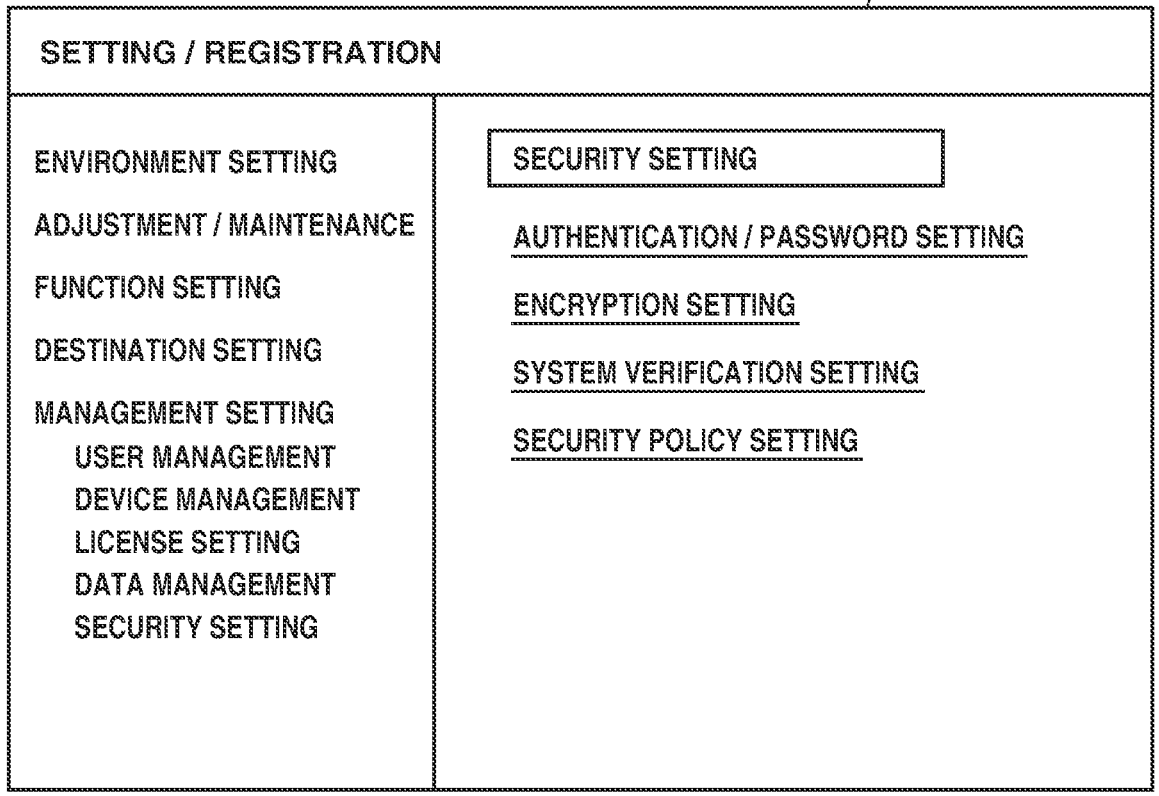

FIG. 9B is a diagram illustrating, as an example, a setting screen 910 which is displayed in a case where a conflict operation is taken into account in a case where a security policy is currently set with respect to the setting screen 600.

In the setting screen 910, the recommended security setting menu button 602 is hidden, so that control is performed in such a way as to make a setting screen for collective setting unable to be displayed.

With the above described series of processing operations, in an image forming apparatus in which the setting of a security policy to be most prioritized is also performed in setting security-related items, it is possible to present a setting screen taking into account a conflict operation between functions for setting security-related items. In this way, the user is enabled to use the image forming apparatus 101 in a state in which the relationship between setting functions for a plurality of security-related items has been set in order.

The first exemplary embodiment is an embodiment in which, when setting of a security policy is performed in the flow illustrated in FIG. 7, without a state as to whether the setting by collective setting is currently set being taken into account, a setting value corresponding to the received security policy setting is set to the image forming apparatus 101.

On the other hand, in the case of setting a security policy in a state in which the setting by collective setting is already performed to the image forming apparatus 101, the following issues occur. For one thing, there is an aspect in which, with respect to setting of security-related items which is controlled by both collective setting and setting that is based on a security policy, the user is unable to determine which of the control operations is being performed in preference to the other. Moreover, as mentioned above, the administrator who is able to set a security policy is one of some administrators having stronger authority than administrators who are able to use the collective setting function. Consider a case where a recommended setting value is set by the collective setting function before setting of a security policy. In this case, with regard to a setting item not included in the policy setting value database 424 but included in the recommended setting value database 421, there is a possibility that, due to another administrator using the collective setting function, a setting value which is not supposable by the security policy administrator is currently set.

Therefore, in a second exemplary embodiment, processing for security policy setting taking into account the case of setting a security policy in a state in which the setting by collective setting has already been performed is described with reference to FIG. 10. Furthermore, the hardware configuration and software configuration of the image forming apparatus 101 and the configurations of setting screens in the second exemplary embodiment are similar to those in the first exemplary embodiment, and are, therefore, omitted from description. Moreover, the flow illustrated in FIG. 8 is also applied as with the first exemplary embodiment. The flow illustrated in FIG. 10 is implemented instead of the flow described with reference to FIG. 7 in the first exemplary embodiment.

Each operation (step) illustrated in the flowchart of FIG. 10 is performed by the CPU 311 reading out a program for implementing each control unit stored in the ROM 312 or the HDD 314 onto the RAM 313 and executing the program.

When the security policy setting control unit 450 supplies, via the web UI control unit 440, the setting screen 610 to a web browser of an external terminal, processing illustrated in FIG. 10 starts.

In step S1001, the security policy setting control unit 450 determines whether an instruction for setting of a security policy has been received. Specific processing is similar to that in step S701, and is, therefore, omitted from description. If it is determined that an instruction for setting of a security policy has been received (YES in step S1001), the security policy setting control unit 450 advances the processing to step S1002, and, if it is determined that the instruction has not been received (NO in step S1001), the security policy setting control unit 450 repeats step S1001, thus waiting to receive the instruction.

Next, in step S1002, the security policy setting control unit 450 determines whether the setting by collective setting has already been performed. The security policy setting control unit 450 reads out setting of a usage environment selected by the usage environment list buttons 511 from the current operation setting data 423, and, in a case where the setting is associated with any one of the six usage environments, the security policy setting control unit 450 determines that collective setting has been performed (YES in step S1002) and then advances the processing to step S1003.

Moreover, in a case where no usage environment is set (NO in step S1002), the security policy setting control unit 450 advances the processing to step S1004.

In step S1003, the security policy setting control unit 450 instructs the security setting control unit 430 to cancel the collective setting. Cancelling the collective setting is able to be performed by the security setting control unit 430 overwriting, with data about a setting value stored in the pre-change setting data 422, data about the corresponding setting value stored in the current operation setting data 423. Additionally, the security setting control unit 430 also changes information concerning the usage environment which is currently selected in the image forming apparatus 101, stored in the current operation setting data 423. Specifically, the security setting control unit 430 overwrites, with such information, information indicating that any usage environment of the image forming apparatus 101 is not currently selected. When processing for cancelling the collective setting by the security setting control unit 430 ends, the security policy setting control unit 450 advances the processing to step S1004.

In step S1004, the security policy setting control unit 450 performs setting of security-related items corresponding to the received security policy setting in a state in which setting of security-related items by the collective setting function is not currently performed. The security policy setting control unit 450 performs the setting by writing, in the current operation setting data 423, the setting items and setting values stored in the policy setting value database 424. Specific processing is similar to that in step S702 and is, therefore, omitted from description. Moreover, with respect to a function the use of which has been restricted by the above setting, the security policy setting control unit 450 performs display control in such a manner that the user is unable to change the function to an available state. Specifically, the security policy setting control unit 450 performs control in such a manner that the user is unable to perform an operation of individually changing a setting value of the setting item corresponding to the selected security policy on a setting screen displayed on the operation unit 320 of the image forming apparatus 101 and a setting screen of the web UI. Furthermore, in a case where the security policy setting received by the security policy setting control unit 450 is an instruction for cancelling a security policy, the security policy setting control unit 450 performs the following control. The security policy setting control unit 450 performs control in such a manner that the user is able to perform an operation of individually changing a setting value of the setting item corresponding to the security policy on a setting screen displayed on the operation unit 320 of the image forming apparatus 101 and a setting screen of the web UI.

Furthermore, as with the first exemplary embodiment, while, in the second exemplary embodiment, the operations have been described with use of an operation performed on the web UI, another configuration using a setting screen which is displayed on the operation unit 320 can be employed.

With the above-described processing, the user is enabled to perform setting of security-related items corresponding to setting of a security policy to the image forming apparatus 101 in consideration of a conflict operation with collective setting.

With the above-described series of processing operations, in the image forming apparatus 101, it is possible to, after cancelling setting of recommended setting values collectively set according to selection of a usage environment, perform setting of a security policy. Here, the setting of a security policy is a setting to be most prioritized in setting of security-related items in the image forming apparatus 101. This enables making clear which setting value is preferentially set between functions of setting security-related items. Moreover, cancelling setting values which have been previously set by the collective setting function before an administrator who is able to set a security policy performs setting enables avoiding a situation in which a setting value which is not assumable by the administrator for a security policy is currently set. Then, it is possible to present a setting screen taking into account a conflict operation between the security policy function and the collective setting function. In this way, the user is enabled to use the image forming apparatus 101 in a state in which the relationship between setting functions for a plurality of security-related items has been set in order.

According to aspects of the present disclosure, in an information processing apparatus having two functions, i.e., a security policy function for setting setting values corresponding to a security policy set in the information processing apparatus and a function for performing collective setting of recommended setting values, it is possible to provide a security-related function taking into account a conflict between the two functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-124676 filed Aug. 4, 2022, which is hereby incorporated by reference herein in its entirety.

What is claimed is:
1. An information processing apparatus having a first function in which first setting values associated with a security policy set to the information apparatus are set to the information processing apparatus, the information processing apparatus comprising:
at least one memory that stores instructions; and
at least one processor that executes the instructions to perform operations comprising:
in a case where the security policy is not currently set to the information processing apparatus in the first function,
in a second function different from the first function, setting, to the information processing apparatus, a second setting values associated with one usage environment selected from among a plurality of usage environments; and
in a case where the security policy is currently set to the information processing apparatus in the first function, in the second function, performing control to prevent setting values associated with any usage environment in the plurality of usage environments from being set to the information processing apparatus.
2. The information processing apparatus according to claim 1, wherein the control to prevent a setting values associated with any usage environment in the plurality of usage environments from being set to the information processing apparatus is control to prevent any usage environment from being selected from among the plurality of usage environments.
3. The information processing apparatus according to claim 2,
wherein the operations further comprise displaying a button configured to be pressed to display a screen for receiving selection of one usage environment from among the plurality of usage environments, and
wherein the control to prevent any usage environment from being selected from among the plurality of usage environments is control to prevent the button from being pressed.
4. The information processing apparatus according to claim 3, wherein the control to prevent any usage environment from being selected from among the plurality of usage environments is control to gray out characters of the button so as to prevent the button from being pressed.
5. The information processing apparatus according to claim 3, wherein the control to prevent any usage environment from being selected from among the plurality of usage environments is control to hide the button.
6. The information processing apparatus according to claim 1, wherein the operations further comprise, setting, to the information processing apparatus, the first setting values associated with the security policy set to the information processing.
7. The information processing apparatus according to claim 1, wherein the information processing apparatus is an image forming apparatus including at least one of a scanner and a printer.
8. The information processing apparatus according to claim 7, wherein the first setting values include a setting value corresponding to a setting item which is identical with a setting item corresponding to a setting value included in the second setting values, and
wherein the identical setting item is a setting item concerning at least one of the scanner and the printer which the information processing apparatus includes.
9. The information processing apparatus according to claim 8, wherein the identical setting item concerning at least one of the scanner and the printer which the information processing apparatus includes is a setting item concerning a history which is recorded during execution of a job.

10. The information processing apparatus according to claim 1,
wherein the first setting values include a setting value corresponding to a setting item which is identical with a setting item corresponding to a setting value included in the second setting values, and
wherein the identical setting item is a setting item concerning a scanner which the information processing apparatus includes, and includes at least one of a setting item concerning a storage location of scanned data and a setting item concerning a history which is recorded during execution of a job.

11. The information processing apparatus according to claim 1,
wherein the first setting values include a setting value corresponding to a setting item which is identical with a setting item corresponding to a setting value included in the second setting values, and
wherein the identical setting item is a setting item concerning a printer which the information processing apparatus includes, and includes at least one of a setting item concerning limitation of a protocol for use in printing and a setting item concerning a history which is recorded during execution of a job.

12. A control method for an information processing apparatus having a first function in which first setting values associated with a security policy set to the information apparatus are set to the information processing apparatus, the control method comprising:
in a case where the security policy is not currently set to the information processing apparatus in the first function,
in a second function different from the first function, setting, to the information processing apparatus, a second setting values associated with one usage environment selected from among a plurality of usage environments; and
in a case where the security policy is currently set to the information processing apparatus in the first function, in the second function, performing control to prevent a setting values associated with any usage environment in the plurality of usage environments from being set to the information processing apparatus.

13. A non-transitory computer-readable storage medium storing computer-executable instructions that, when executed by a computer, cause the computer to perform a control method for an information processing apparatus having a first function in which first setting values associated with a security policy set to the information apparatus are set to the information processing apparatus, the control method comprising:
in a case where the security policy is not currently set to the information processing apparatus in the first function,
in a second function different from the first function, setting, to the information processing apparatus, second setting values associated with one usage environment selected from among a plurality of usage environments; and
in a case where the security policy is currently set to the information processing apparatus in the first function, in the second function, performing control to prevent a setting values associated with any usage environment in the plurality of usage environments from being set to the information processing apparatus.

14. The information processing apparatus according to claim 6,
wherein third setting values that are set before the second setting values are set are stored, and
wherein in a case where the security policy is set to the information processing apparatus after the second setting values are set, with respect to setting items corresponding to the second setting values, the third setting values are set and then the first setting values are set.

15. The information processing apparatus according to claim 1,
wherein the first setting values include a setting value corresponding to a setting item which is identical with a setting item corresponding to a setting value included in the second setting values.

16. The information processing apparatus according to claim 1,
wherein the plurality of usage environments includes at least one of an intranet connection environment systematically protected by a firewall, a direct internet connection environment, an internet connection prohibited environment isolated from the internet, a home network environment, a public network environment, and a highly confidential information environment.

* * * * *